US008689019B2

(12) United States Patent
Kawata et al.

(10) Patent No.: US 8,689,019 B2
(45) Date of Patent: Apr. 1, 2014

(54) INFORMATION PROCESSING APPARATUS, METHOD, AND PROGRAM FOR SWITCHING BETWEEN TWO GRAPHICS CHIPS SAFELY AND EASILY IN ACCORDANCE WITH USE PURPOSE

(75) Inventors: Masaru Kawata, Nagano (JP); Shigenobu Fukuda, Nagano (JP); Kenichiro Tezuka, Nagano (JP); Ippei Murofushi, Nagano (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/097,890

(22) Filed: Apr. 29, 2011

(65) Prior Publication Data

US 2011/0261062 A1    Oct. 27, 2011

Related U.S. Application Data

(63) Continuation-in-part of application No. PCT/JP2010/007606, filed on Dec. 28, 2010.

(30) Foreign Application Priority Data

Jan. 7, 2010  (JP) ................................ P2010-001606

(51) Int. Cl.
*G06F 1/00*     (2006.01)
*G06F 1/32*     (2006.01)
*G06F 15/16*    (2006.01)

(52) U.S. Cl.
USPC ........................... 713/300; 713/320; 345/502

(58) Field of Classification Search
USPC ........................................................ 713/300
See application file for complete search history.

(56) References Cited

U.S. PATENT DOCUMENTS

| | | | | |
|---|---|---|---|---|
| 6,044,248 A * | 3/2000 | Mochizuki et al. | ........... | 340/7.47 |
| 6,724,389 B1 * | 4/2004 | Wilen et al. | ................... | 345/520 |
| 6,806,893 B1 * | 10/2004 | Kolawa et al. | ................ | 715/848 |
| 6,832,269 B2 * | 12/2004 | Huang et al. | .................... | 710/11 |
| 7,034,487 B1 * | 4/2006 | Murphy et al. | ................ | 318/466 |
| 7,663,633 B1 * | 2/2010 | Diamond et al. | ............. | 345/503 |
| 2002/0180725 A1 * | 12/2002 | Simmonds et al. | ........... | 345/213 |

(Continued)

FOREIGN PATENT DOCUMENTS

| EP | 1 855 181 A2 | 11/2007 |
|---|---|---|
| JP | 09-204854 | 8/1997 |

(Continued)

OTHER PUBLICATIONS

U.S. Appl. No. 12/497,939, filed Jul. 6, 2009, Kawata, et al.

(Continued)

*Primary Examiner* — Suresh Suryawanshi
(74) *Attorney, Agent, or Firm* — Oblon, Spivak, McClelland, Maier & Neustadt, L.L.P.

(57) ABSTRACT

An information processing apparatus that includes a first graphic processing module having a first level of graphic performance and a second graphic processing module having a second level of graphic performance, which is greater than the first level of graphic performance. The information processing apparatus also includes a controller that selects one of the first graphic processing module or the second graphic processing module by determining whether the information processing apparatus is capable of outputting data with the first level of graphic performance or the second level of graphic performance, and detects whether the information processing apparatus is provided with power via a battery or via an external power source.

23 Claims, 23 Drawing Sheets

(56) References Cited

U.S. PATENT DOCUMENTS

| | | | |
|---|---|---|---|
| 2004/0021658 | A1 | 2/2004 | Chen |
| 2005/0044437 | A1 | 2/2005 | Dunstan et al. |
| 2007/0171230 | A1 | 7/2007 | Iwase et al. |
| 2007/0283175 | A1 | 12/2007 | Marinkovic |
| 2008/0143731 | A1 | 6/2008 | Cheng |
| 2008/0182630 | A1 | 7/2008 | Parks et al. |
| 2008/0204460 | A1 | 8/2008 | Marinkovic |
| 2009/0153540 | A1 | 6/2009 | Blinzer et al. |
| 2009/0160733 | A1 | 6/2009 | Chiba |
| 2010/0007667 | A1 | 1/2010 | Kawata |
| 2011/0279957 | A1* | 11/2011 | Tadano ............... 361/679.02 |

FOREIGN PATENT DOCUMENTS

| | | |
|---|---|---|
| JP | 2007-048219 A | 2/2007 |
| JP | 2007-179225 | 7/2007 |
| JP | 2009-151242 A | 7/2009 |
| JP | 2009-539192 A | 11/2009 |
| JP | 2010-020596 A | 1/2010 |
| WO | WO 2008/091479 A1 | 7/2008 |

OTHER PUBLICATIONS

Extended European Search Report issued Jan. 25, 2013 in Patent Application No. 10842079.5.

Office Action issued Sep. 10, 2013, in Japanese Application No. 2010-001606 (with English-language Translation).

XWIN II, "VAIO type Z, Generalization Version No. 2, XWIN II Weblog, Tedious Pursuance of Interested Matter," Japan, Aug. 26, 2008, p. 1/10 to 6/10. http://xwin2.typepad.ip/xwin2weblog/2008/08/vaio-type-z-2-4.html.

Fujimoto, "Ultimate Evidence" Z High Performance and High Mobile Property VAIO [type Z] Advent, Impress Watch/sonyfan, Japan, Impress Watch Corporation, Jul. 16, 2008, p. 1/3-3/3. http://watch.impress.co.jp/sonyfan/special/080716.

Special Edition 1, Windows Q&A Special 40p: Part 2 Customization to Simplify Use of Shortcut Menu, PC Japan, Japan, Softbank Creative Corporation, Dec. 1, 2008, vol. 13, No. 12 (the 141th volume of the set), p. 35.

International Search Report issued on Feb. 8, 2011 in International Application No. PCT/JP2010/007606 filed on Jan. 7, 2010.

International Written Opinion issued on Feb. 8, 2011 in International Application No. PCT/JP2010/007606 filed on Jan. 7, 2010.

New Sony Notebooks Deliver the Ultimate in Mobility, Performance and Entertainment, [online], SonyElectronics Inc., Jan. 6, 2010, 6th paragraph, [retrieved on Jan. 31, 2011]. Retrieved from the Internet: <URL: http://news.sel.sony.com/en/press_room/consumer/computer_peripheral/notebooks/release/55906.html>.

Sony Electronics News & Information, Press Room, [online] Sony Electronics, Inc., [retrieved on Jan. 31, 2011]. Retrieved from the Internet: <URL:http://news.sel.sony.com/en/press_room/consumer/computer_peripheral/notebooks?page=3&archive=>.

Unable to swtich display card on IdeaPad V360/V460, [online], Jan. 10, 2011, see Statement Description:, Solution:, [retrieved on Jan. 31, 2011]. Retrieved from the Interent: <URL: http://consumersupport.lenovo.com/in/en/HintsandTips/hints_show_12947146012942.html>.

Waksugi, Norihiko. Optimus Technology: 3rd generation GPU switching technology by NVIDIA, [online], PC Watch, Impress Watch Corporation, Feb. 9, 2010, see Conventional GPU switching tech., [retrieved on Jan. 31, 2011]. Retrieved from the Internet: <URL: http://pc.watch.impress.co.jp/docs/news/20100209_347871.html>.

Notification of the First Office Action issued Nov. 25, 2013, in Chinese Patent Application No. 201080029923 (with English Translation).

* cited by examiner

INFORMATION PROCESSING APPARATUS, METHOD, AND PROGRAM FOR SWITCHING BETWEEN TWO GRAPHICS CHIPS SAFELY AND EASILY IN ACCORDANCE WITH USE PURPOSE

This application is a continuation-in-part of international PCT Patent Application PCT/JP2010/007606, filed Dec. 28, 2010, which claims priority to Japanese Priority Patent Application JP 2010-001606 filed in the Japan Patent Office on Jan. 7, 2010, the entire content of which is hereby incorporated by reference.

TECHNICAL FIELD

The present invention relates to an information processing apparatus including a plurality of graphics chips having different graphics performances, and to an information processing method and a program for an information processing apparatus.

BACKGROUND ART

In related art, there is an information processing apparatus on which two graphics chips having different graphics performances are mounted and which implements reduction in power consumption and improvement in graphics performance by switching the operations of the chips (see, for example, Patent Literature 1)).

In the information processing apparatus disclosed in Patent Literature 1, the switching of the two graphics chips is performed with a mechanical switch that is manually operable by a user.

CITATION LIST

Patent Literature

[PTL 1]
Japanese Patent Application Laid-open No. 2007-179225

SUMMARY OF INVENTION

However, in the case where a user manually switches the graphics chips as in the information processing apparatus disclosed in Patent Literature 1, a safety problem may arise. Specifically, for example, if a user switches the graphics chips during execution of a specific application in the information processing apparatus, a trouble may be caused in the operation of the application.

Further, it takes time and effort for a user to judge which graphics chip is proper as occasion demands in consideration of a trouble that may be caused in the operation of the application and manually switch the graphics chips. Further, this may prevent the effective utilization of the two graphics chips having different graphics performances.

In view of the above-mentioned circumstances, it is desirable to provide an information processing apparatus, an information processing method, and a program capable of safely and easily switching two graphics chips having different graphics performances in accordance with a use purpose of a user.

According to one embodiment, the present invention is directed to an information processing apparatus, comprising: a first graphic processing module having a first level of graphic performance; a second graphic processing module having a second level of graphic performance, which is greater than the first level of graphic performance; a controller configured to select one of the first graphic processing module or the second graphic processing module by determining whether the information processing apparatus is capable of outputting data with the first level of graphic performance or the second level of graphic performance, and detecting whether the information processing apparatus is provided with power via a battery or via an external power source.

The information processing apparatus may include an interface compatible with the second level of graphic performance.

The controller of the information processing apparatus may be configured to determine that the information processing apparatus is capable of outputting data with the second level of graphic performance by detecting that a connection is provided to the interface.

The controller of the information processing apparatus may also be configured to determine that the information processing apparatus is capable of outputting data with the second level of graphic performance by determining that an application executed by the information processing apparatus is compatible with the second level of graphic performance.

The controller of the information processing apparatus may also be configured to detect that the information processing apparatus is provided with power via the external power source by detecting that power is being supplied via an external connection.

The controller of the information processing apparatus may also be configured to select the second graphic processing module when it is determined that the information processing apparatus is capable of outputting data with the second level of graphic performance.

The controller of the information processing apparatus may also be configured to select the second graphic processing module when it is detected that the information processing apparatus is provided with power via the external power source.

The controller of the information processing apparatus may also be configured to select the first graphic processing module when it is determined that the information processing apparatus is not capable of outputting data with the second level of graphic performance.

The controller of the information processing apparatus may also be configured to select the first graphic processing module when it is detected that the information processing apparatus is provided with power via the battery.

The controller of the information processing apparatus may also be configured to display a notification when the controller switches between the first and second graphic processing modules.

The controller of the information processing apparatus may also be configured to display a notification when the controller selects either the first graphic processing module or the second graphic processing module.

The controller of the information processing apparatus may also be configured to display a power consumption value upon selecting the first graphic processing module or the second graphic processing module.

The notification may include a button configured to receive a user input indicating whether the selection is accepted.

The controller of the information processing apparatus may also be configured to determine whether an application executed at the information processing apparatus is affected by the selecting, and the displayed notification indicates that the application is affected.

The notification may include a button configured to receive a user input indicating whether the selection is accepted.

The controller of the information processing apparatus may also be configured to switch between the first and second graphic processing modules when the application affected by the selecting is terminated.

The first graphic processing module may be configured to consume a first amount of power during operation, and the second graphic processing module may be configured to consume a second amount of power, which is greater that the first amount of power, during operation.

The controller of the information processing apparatus may also be configured to control the information processing apparatus to be in each of a first mode in which the controller automatically selects one of the first and second graphic processing modules, a second mode, in which the first graphic processing module is selected, and a user input is required to switch to the second graphic processing module, and a third mode, in which the second graphic processing module is selected, and a user input is required to switch to the first graphic processing module.

The information processing apparatus may also include s a switch having a movable portion configured to be moved between three positions, each corresponding to one of the first, second and third modes.

The switch may be a triangular shaped switch, and the movable portion may be configured to be moved between each corner of the triangle, and each corner of the triangle corresponds to one of the first, second and third modes.

When the information processing apparatus is in the second mode and the controller determines that the information processing apparatus is capable of outputting data with the second level of graphic performance, the controller may be configured to control a display of the information processing apparatus to display a notification.

When the information processing apparatus is in the third mode and the controller detects that the information processing apparatus is provided with power via the battery, the controller may be configured to control a display of the information processing apparatus to display a notification.

According to another embodiment, the invention is directed to a method performed by an information processing apparatus including a first graphic processing module having a first level of graphic performance and a second graphic processing module having a second level of graphic performance, which is greater than the first level of graphic performance, the method comprising: determining, by a controller of the information processing apparatus, whether the information processing apparatus is capable of outputting data with the first level of graphic performance or the second level of graphic performance; detecting, by the controller of the information processing apparatus, whether the information processing apparatus is provided with power via a battery or via an external power source; and selecting, by the controller of the information processing apparatus, one of the first graphic processing module or the second graphic processing module based on the determining and detecting.

According to another embodiment, the invention is directed to a non-transitory computer readable medium including computer program instructions, which when executed by an information processing apparatus including a first graphic processing module having a first level of graphic performance and a second graphic processing module having a second level of graphic performance, which is greater than the first level of graphic performance, cause the information processing apparatus to perform a method comprising: determining whether the information processing apparatus is capable of outputting data with the first level of graphic performance or the second level of graphic performance; detecting whether the information processing apparatus is provided with power via a battery or via an external power source; and selecting one of the first graphic processing module or the second graphic processing module based on the determining and the detecting.

DESCRIPTION OF EMBODIMENTS

Figure 1:
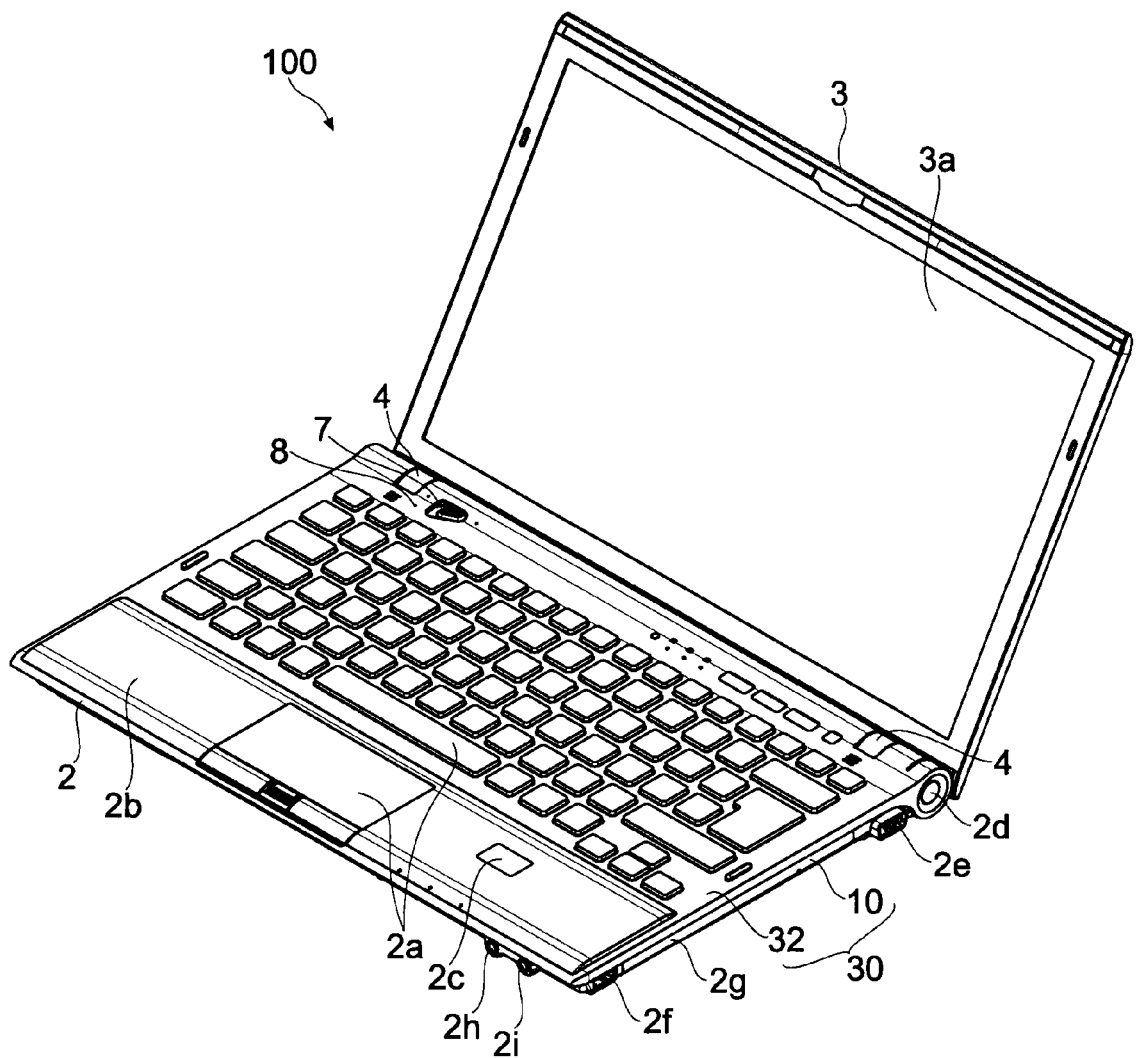
FIG. 1 is a perspective view showing a PC according to an embodiment of the present invention in the state of being opened.
Figure 2:
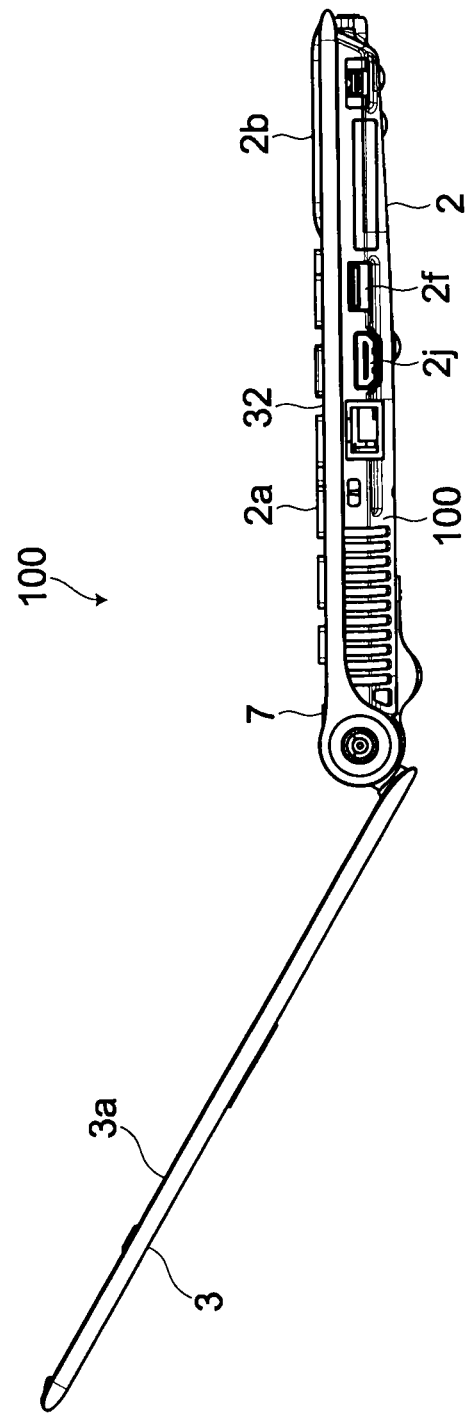
FIG. 2 is a left side view of the PC according to the embodiment of the present invention.

Hereinafter, an embodiment of the present invention will be described with reference to the drawings.
(External Structure of PC)
FIG. 1 is a perspective view showing a PC according to an embodiment of the present invention in the state of being opened. FIG. 2 is a left side view of the PC.

As shown in FIGS. 1 and 2, a PC 100 is a notebook PC, and includes a main body unit 2 and a display 3. The main body unit 2 and the display 3 are relatively rotatably connected with each other with hinges 4. The display 3 includes an LCD (liquid crystal display) 3a in a region where the display 3 is caused to face the main body unit 2 when being closed to the main body unit 2.

The main body 2 includes, in a region where the main body 2 faces the display 3 when the display 3 is closed thereto, an operation input unit 2a such as a keyboard and a touch pad, a palm rest member 2b, a non-contact IC (integrated circuit) card antenna 2c, and a slide mode selection switch 7. On the palm rest member 2b, a user puts the wrist when performing an input operation. The main body unit 2 further includes, on a side surface thereof, a power supply switch 2d, an external display connector 2e, a USB (universal serial bus) connector 2f, a disk insertion and removal opening 2g for a disk drive (not shown), a microphone input terminal 2h, a headphone connector 2i, and an HDMI connector 2j. To the HDMI connector 2j, an external monitor such as a TV is connected through an HDMI cable, and an image signal generated by the PC 100 is output in conformity with an HDMI standard. To the main body 2, a DVI connector (not shown) is also provided that is used for outputting an image signal to an external monitor through a DVI cable in conformity with a DVI standard.

The main body 2 further includes a casing 30 that is constituted of a top case 32 and a bottom case 10. To the top case 32, the operation input unit 2a and the like are provided.

The mode selection switch 7 is used to switch three modes (described later) of the PC 100, and is formed so that a movable portion can be moved among three switching positions corresponding to the three modes along a triangular shape of a guide unit.

Figure 3:
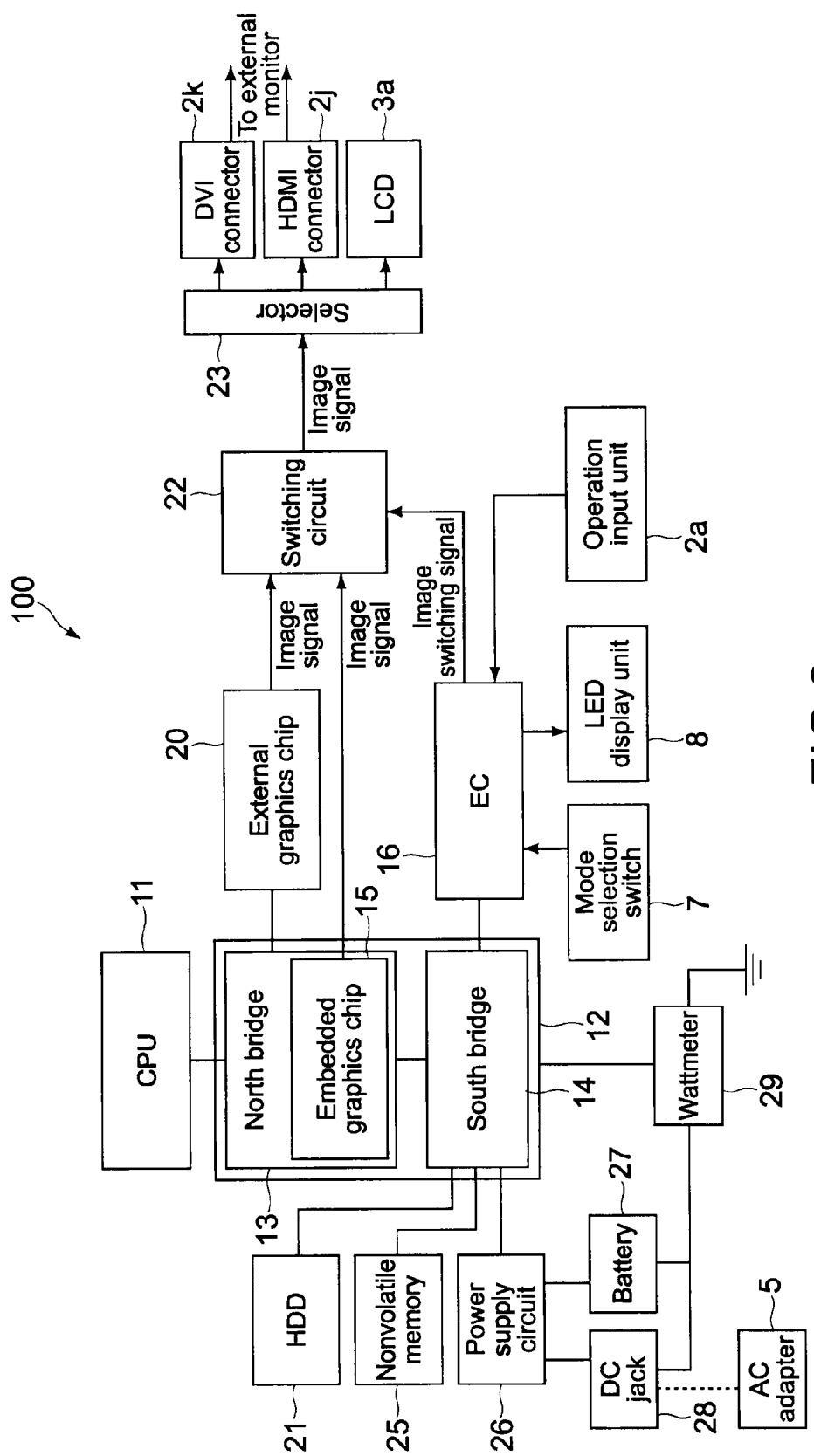
FIG. 3 is a block diagram showing the hardware structure of the PC according to the embodiment of the present invention.

In the vicinity of each of three corners of the mode selection switch 7, three LED (light emitting diode) displays 8 are provided that notify the user of a mode in execution out of the three modes in accordance with a switch position of the mode selection switch 7. The LED displays 8 will be described later in detail.
(Hardware Structure of PC)
FIG. 3 is a block diagram showing the hardware structure of the PC 100. As shown in FIG. 3, in addition to the structures shown in FIGS. 1 and 2, the PC 100 includes a CPU (central processing unit) 11, a chip set 12, an embedded graphics chip 15, an external graphics chip 20, an EC (embedded controller) 16, a switching circuit 22, a selector 23, a DVI connector 2k, an HDD (hard disk drive) 21, a nonvolatile memory 25, a power supply circuit 26, a battery 27, a DC jack 28, and a wattmeter 29.

The chip set 12 manages the transmission and reception of data between devices in the PC 100, and is constituted of a north bridge 13 and a south bridge 14.

In the north bridge 13, the embedded graphics chip 15, a memory controller (not shown), and the like are embedded. The north bridge 13 is connected with the CPU 11 and the external graphics chip 20. The south bridge 14 has a connection interface with peripheral devices such as the HDD 21, the nonvolatile memory 25, and the EC 16.

The embedded graphics chip 15 and the external graphics chip 20 each perform a drawing process based on data received from the CPU 11, and output a generated image signal to the switching circuit 22 to display an image on the LCD 3a and the external monitor. In this embodiment, the external graphics chip 20 has a higher graphics performance than the embedded graphics chip 15.

The embedded graphics chip 15 has a lower graphics performance than the external graphics chip 20. However, the power consumption of the embedded graphics chip 15 is smaller than that of the external graphics chip 20. On the other hand, the external graphics chip 20 has the higher graphics performance in terms of a 3-D process, a high-resolution drawing process, and the like, but involves high power consumption to drive the external graphics chip 20 itself and the peripheral devices thereof, with the result that an electrical load with respect to the entire system of the PC 100 is increased.

In accordance with the switching of the modes with the mode selection switch 7, the PC 100 manually or automatically selects one of the embedded graphics chip 15 and the external graphics chip 20 that have the different graphics performances and thus can perform the drawing process (this will be described later in detail).

The HDD 21 stores, in a built-in hard disk, data or various programs such as utility software for executing the mode switching process in this embodiment, a graphics driver necessary for the operation for various graphics chips, and FEP.sys. Here, the PC 100 may be provided with a flash memory instead of the HDD 21.

The nonvolatile memory 25 is a ROM (read only memory), an EEPROM (electrically erasable and programmable read only memory), a flash memory, or the like, and stores data or programs such as BIOS and firmware.

The EC 16 has functions such as a KBC (keyboard controller), an ACPI/EC, and a PIC (programmable IO controller). The KBC controls a keyboard as the operation input unit 2a. The ACPI/EC manages the power supply in accordance with an ACPI (advanced configuration and power interface), which is a standard that relates to electrical control. The PIC provides an interface with the utility software.

With the KBC, the EC 16 can detect the operation of the operation input unit 2a by the user, and can notify a high-order system such as an OS (operating system) of information called scan code. In addition, the EC 16 includes an interface for performing communication with a system such as the BIOS and the OS (described later) with the PIC, and can transmit and receive a command or data. Further, the EC 16 is connected with the mode selection switch 7 and the LED display 8.

The switching circuit 22 switches an image signal outputted from one of the embedded graphics chip 15 and the external graphics chip 20, and outputs the signal to the LDC 3a, the HDMI connector 2j, and the DVI connector 2k. In accordance with the selection of the graphics chip in each of the modes, the EC 16 outputs an image switching signal to the switching circuit 22, and controls the switching of the image signal outputted from the graphics chips. The image signal outputted to the HDMI connector 2j and the DVI connector 2k is then outputted to the external monitor through the HDMI cable and the DVI cable, respectively.

The power supply circuit 26 is connected with one of the battery 27, such as a lithium ion battery, and the DC jack 28 for inputting commercial power through an AC adapter 5, and supplies the power to the respective units of the PC 100 therethrough.

The wattmeter 22 is connected to the battery 27 and the DC jack 28, measures an electric power value (current value) of electric power supplied therefrom, and transmits the measurement value to the CPU 11. The measurement value is used in a display process of the power consumption before and after the mode switching, which will be described later in detail.

(Details of Mode Selection Switch and LED Display)

Figure 4:
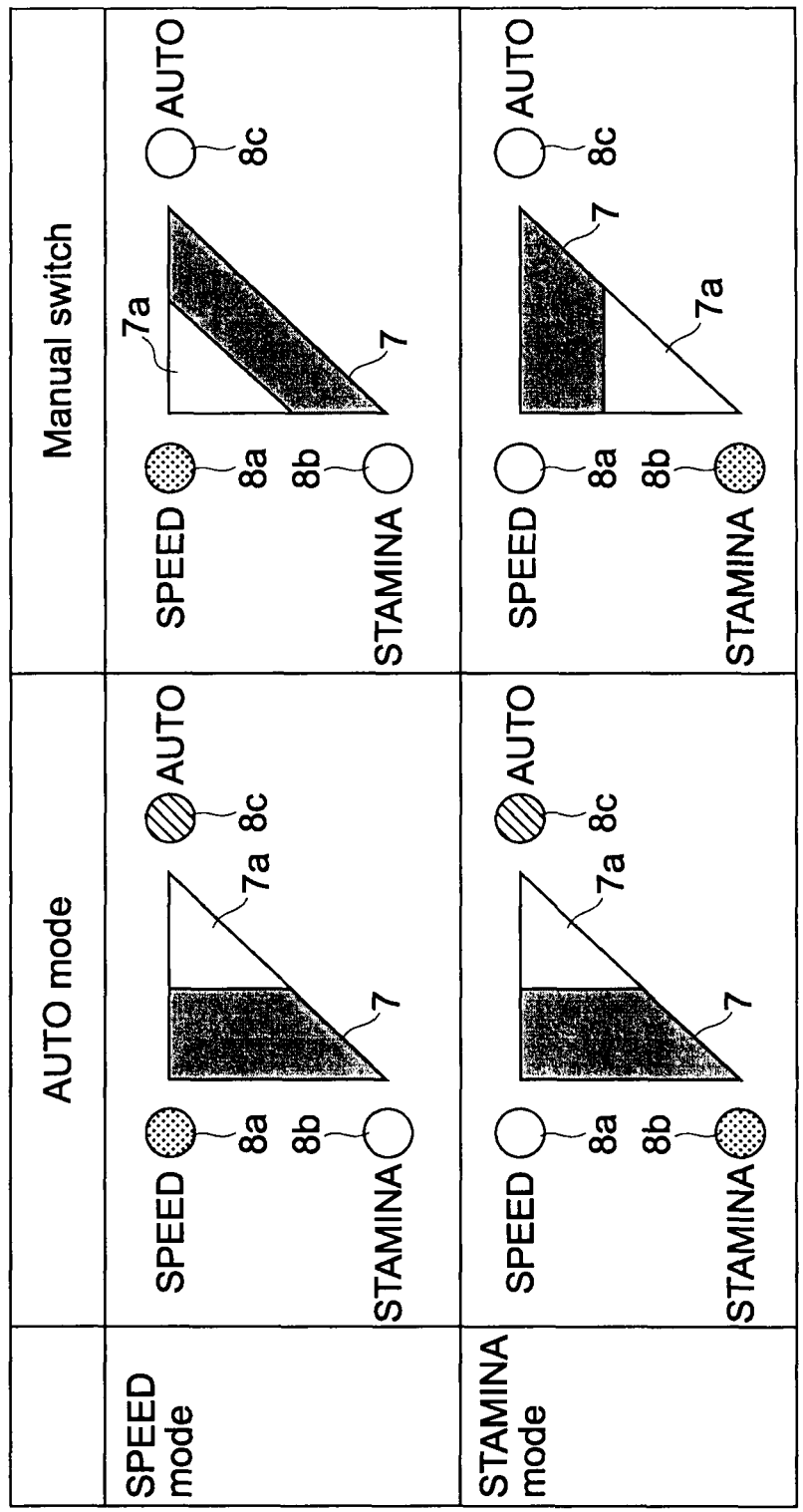
FIG. 4 is a diagram showing a lighted state of an LED display in accordance with a switch position of a mode selection switch according to the embodiment of the present invention.

Next, the mode selection switch 7 and the LED display 8 will be described in detail. FIG. 4 is a diagram showing a lighted state of the LED display 8 in accordance with the switch position of the mode selection switch 7.

In this embodiment, the PC 100 has three operation modes of a STAMINA mode, a SPEED mode, and an AUTO mode. In the STAMINA mode, the drawing process is performed all the time by the embedded graphics chip 15 in consideration of electric power saving, that is, in consideration of lasting driving of the battery 27 as long as possible. In the SPEED mode, the drawing process is performed all the time by the external graphics chip 20. Importance is placed on a drawing process performance. In the AUTO mode, an appropriate graphics chip is determined based on a use condition of the PC 100, and the graphics chip determined performs the drawing process.

In other words, in the AUTO mode, switching is performed between the STAMINA mode and the SPEED mode when necessary. The PC 100 executes one of those three modes by switching. Thus, one of the embedded graphics chip 15 and the external graphics chip 20 performs the drawing process.

As shown in FIG. 4, in the AUTO mode, a movable portion 7a of the mode selection switch 7 is disposed at the upper right portion, and an LED display 8c of "AUTO" is lighted. Further, in the AUTO mode, depending on the graphics chip currently selected by the PC 100, that is, depending on a mode in execution, SPEED mode or STAMINA mode, one of LED displays 8a and 8b is lighted too. The color of a light source of the LED displays 8a and 8b is set to be different from the color of a light source of the LED display 8c.

In addition, in the case where the manual switching (not the AUTO mode) is selected, and the SPEED mode is selected, the movable portion 7a is disposed on the upper left portion. In the case where the STAMINA mode is selected, the movable portion 7a is disposed on the lower left. Further, one of the LED displays 8a and 8b corresponding to the SPEED mode and the STAMINA mode, respectively, is lighted.

(PC Operation)

Subsequently, a description will be given on mode switching operations in the PC structured as described above. In the following, the CPU 11 will be described as a main operation subject, but the operations are performed in cooperation with various kinds of hardware and software as described later.

(Operation at Time of Changing Switch)

First, a description will be given on an operation of the PC 100 in the case where the user selects a position corresponding to each of the modes with the mode selection switch 7.

Figure 5:
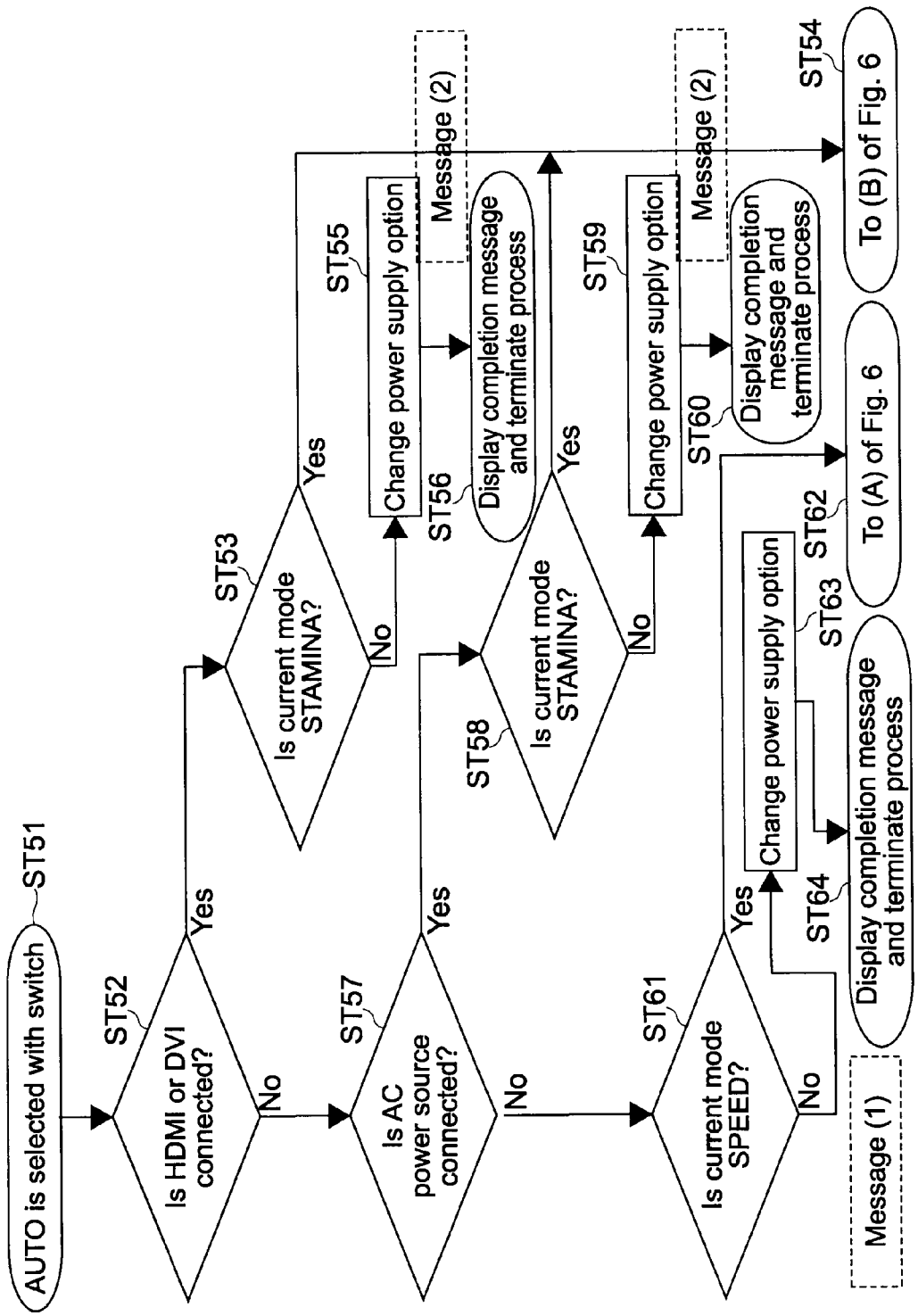
FIG. 5 is a flowchart showing the operation flow of the PC in the case where an AUTO mode is selected with the mode selection switch in the embodiment of the present invention.
Figure 6:
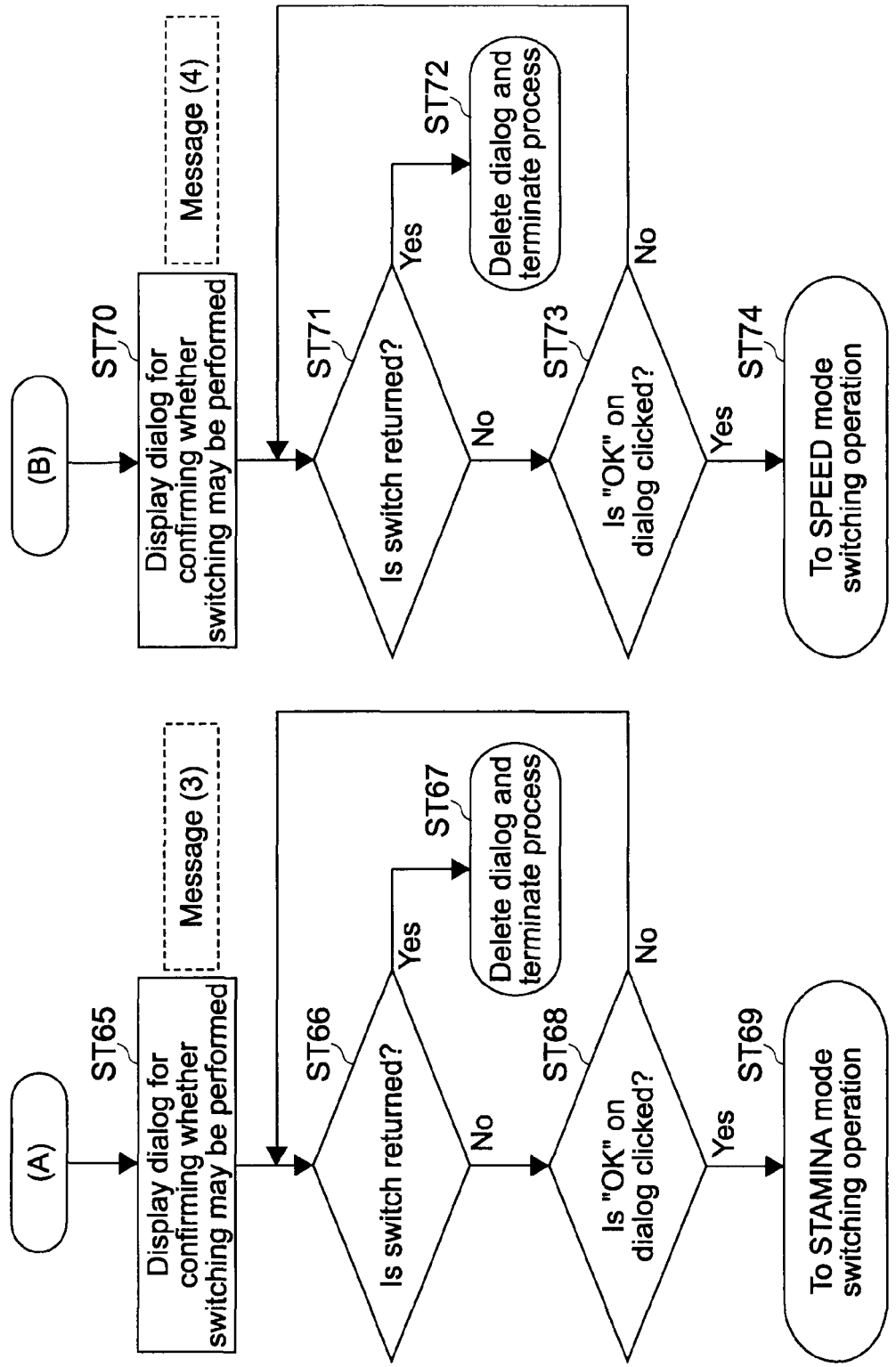
FIG. 6 is a flowchart showing the operation flow of the PC in the case where the AUTO mode is selected with the mode selection switch in the embodiment of the present invention.

FIGS. 5 and 6 are flowcharts showing the operations of the PC 100 in the case where the AUTO mode is selected with the mode selection switch 7.

As shown in FIG. 5, when the AUTO mode is selected with the mode selection switch 7 (Step 51), the CPU 11 judges whether the external monitor is connected to the HDMI connector 2j or the DVI connector 2k (Step 52).

Here, in this embodiment, in the case where the external monitor is connected to the HDMI connector 2j or the DVI connector 2k, the PC 100 is capable of operating only in the SPEED mode in the hardware design.

In Step 52, when judging that the external monitor is connected (Yes), the CPU 11 judges whether a current mode is the STAMINA mode or not (Step 53). When judging that the current mode is the STAMINA mode (Yes), the CPU 11 performs the subsequent switching process of (B) of FIG. 6 (Step 54).

In Step 53, when judging that the current mode is not the STAMINA mode (No), the CPU 11 changes only a setting of a power supply option (Step 55), because the current mode is the SPEED mode, and it is unnecessary to switch the graphics chips. Then, the CPU 11 displays a message (message (2)) indicating a setting completion and terminates the process (Step 56).

Figure 21:
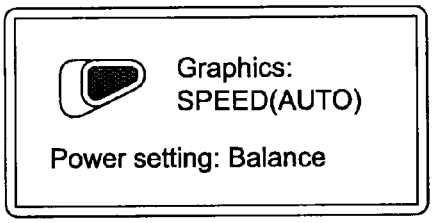
FIG. 21 is a diagram showing an example of a message that indicates the completion of the power supply setting for the AUTO mode and the SPEED mode in the embodiment of the present invention.

Here, the power supply option is held by the OS of the PC 100 for each mode, and is used to perform an appropriate power supply setting in accordance with the selection of the graphic chip, that is, depending on whether the drawing process performance or the electric power saving is emphasized. Therefore, in Step 55, the power supply option is the setting in which the drawing process performance is emphasized. FIG. 21 is a diagram showing an example of the message (2) that indicates the completion of the power supply setting for the AUTO mode and the SPEED mode.

In Step 53, when judging that the current mode is the STAMINA mode, as shown in (B) of FIG. 6, the CPU 11 indicates a dialog (message (4)) for confirming with the user whether the STAMINA mode can be switched to the SPEED mode (Step 70).

Figure 23:
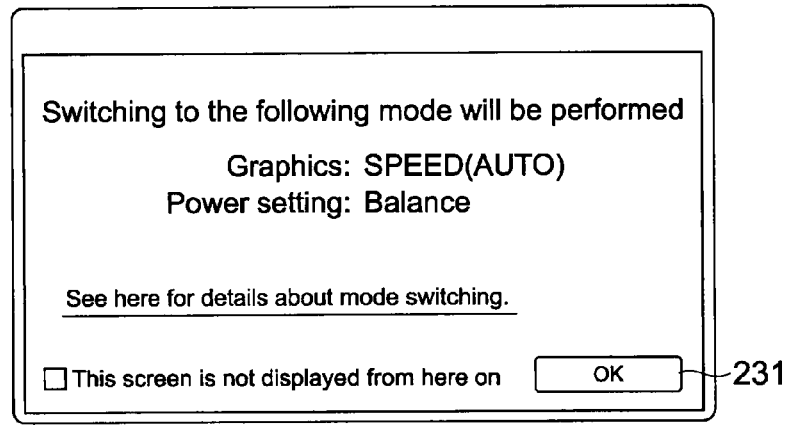
FIG. 23 is a diagram showing an example of a dialog for confirming with the user whether it is possible to perform switching to the AUTO and SPEED modes by the PC in the embodiment of the present invention.

FIG. 23 is a diagram showing an example of the dialog (message (4)). As shown in FIG. 23, on the dialog, an OK button 231 for permitting the switching to the SPEED mode is displayed.

Then, the CPU 11 judges whether the mode selection switch 7 is returned to the state prior to the switching to the AUTO mode (Step 71). When judging that the mode selection switch 7 is returned (Yes), the CPU 11 deletes the dialog and terminates the process (Step 72). That is, by returning the mode selection switch 7, the mode switching process is canceled.

When the mode selection switch 7 is not returned (No), the CPU 11 judges whether the OK button 231 in the dialog is clicked or not (Step 73). When judging that the OK button 231 is clicked (Yes), the CPU 11 performs a switching operation to the SPEED mode (Step 74). The switching operation to the SPEED mode will be described later in detail.

Returning to FIG. 5, in Step 52, when the CPU 11 judges that the external monitor is not connected (No), the CPU 11 judges whether the AC adapter 5 is connected to the DC jack 28 (Step 57). When judging that the AC adapter 5 is connected (Yes), the CPU 11 performs the same processes as the processes of Steps 53 to 56 (Steps 58 to 60). That is, even if the external monitor is not connected to the HDMI connector 2*j* or the DVI connector 2*k*, in the case where the AC adapter 5 is connected to the DC jack 28, and it is unnecessary to take into consideration the drive time period of the battery 27, the CPU 11 performs the SPEED mode to emphasize the drawing process performance.

In Step 57, when judging that the AC adapter 5 is not connected (No), the CPU 11 judges whether the current mode is the SPEED mode or not (Step 61). When judging that the current mode is the SPEED mode (Yes), the CPU 11 subsequently performs a switching process of (A) of FIG. 6 (Step 62).

In Step 61, when judging that the current mode is not the SPEED mode (No), that is, judging that the current mode is the STAMINA mode, the CPU 11 changes only a setting of a power supply option (Step 63), because it is unnecessary to switch the modes. Then, the CPU 11 displays a message (message (1)) indicating a setting completion and terminates the process (Step 64).

Figure 20:
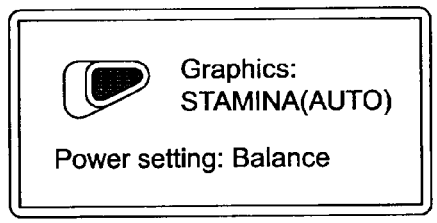
FIG. 20 is a diagram showing an example of a message that indicates a completion of a power supply setting for the AUTO mode and the STAMINA mode in the embodiment of the present invention.

That is, in this case, the CPU 11 sets an appropriate power supply option to maintain the operation by the battery 27 as much as possible with the low power consumption. FIG. 20 is a diagram showing an example of the message (1) that indicates the completion of the power supply option setting for the AUTO mode and the STAMINA mode.

Figure 22:
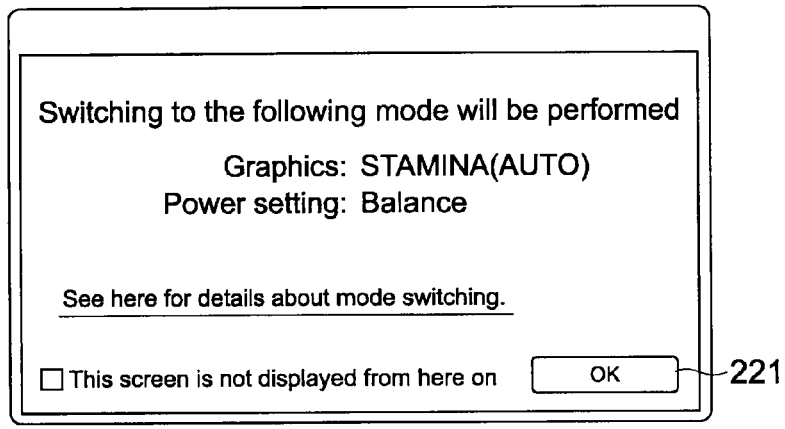
FIG. 22 is a diagram showing an example of a dialog for confirming with a user whether it is possible to perform switching to the AUTO and STAMINA modes by the PC in the embodiment of the present invention.

In Step 61, when judging that the current mode is the SPEED mode, as shown in (A) of FIG. 6, the CPU 11 indicates a dialog (message (3)) for confirming with the user whether the SPEED mode can be switched to the STAMINA mode (Step 65). FIG. 22 is a diagram showing an example of the dialog (message (3)). As shown in FIG. 22, on the dialog, an OK button 221 for permitting the switching to the STAMINA mode is indicated.

The subsequent operations are the same as the processes of Steps 71 to 74 in (B) of FIG. 6 except that the STAMINA mode and the SPEED mode are reversed (Steps 66 to 69). That is, when the switching with the mode selection switch 7 is not canceled, and the OK button 221 on the dialog is clicked, the CPU 11 performs the switching operation to the STAMINA mode. The switching operation to the STAMINA mode will be described later in detail.

Figure 7:
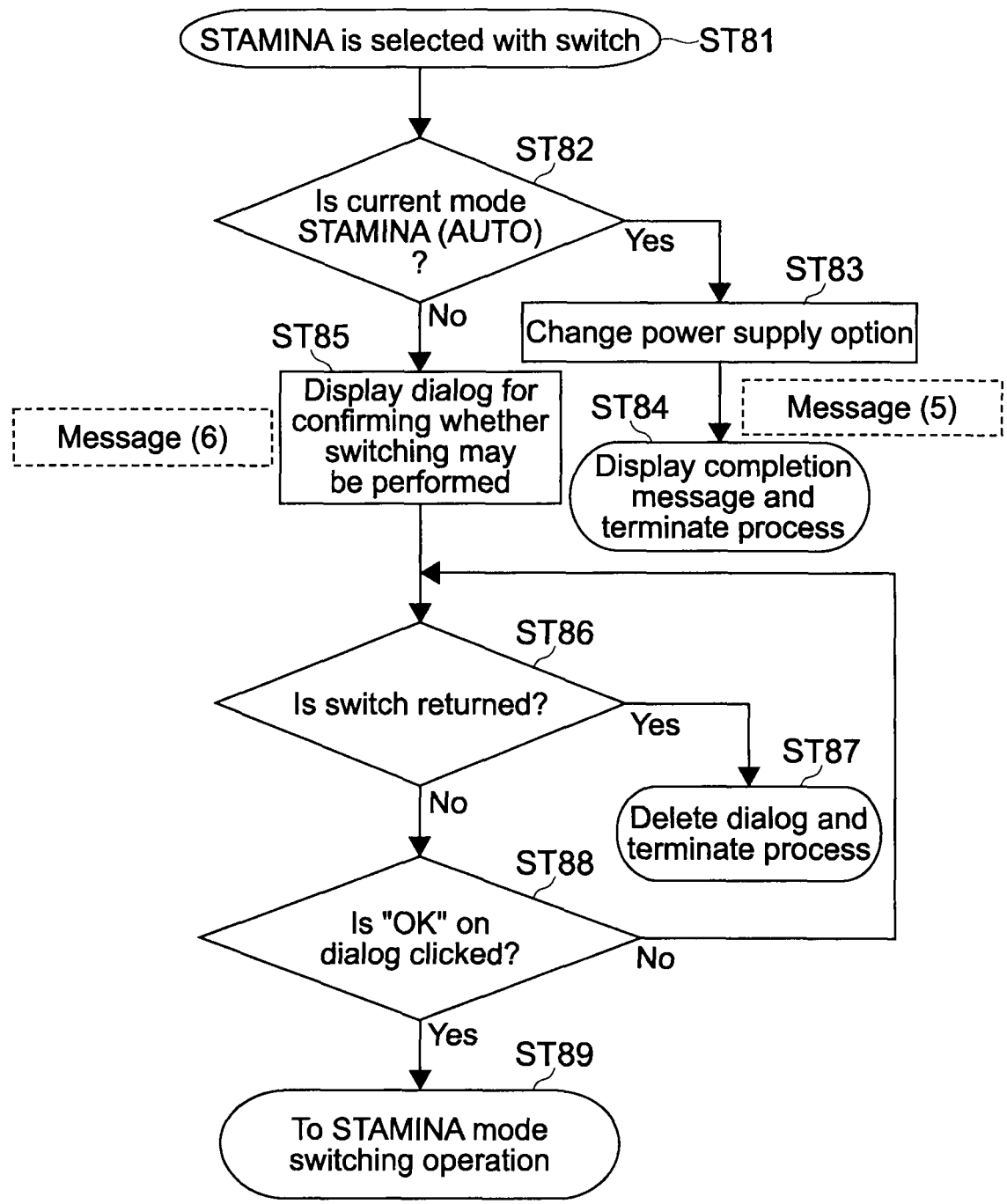
FIG. 7 is a flowchart showing the operation flow of the PC in the case where a STAMINA mode is selected with the mode selection switch in the embodiment of the present invention.

FIG. 7 is a flowchart showing the operation flow of the PC 100 in the case where the switching to the STAMINA mode is performed with the mode selection switch 7.

Figure 24:
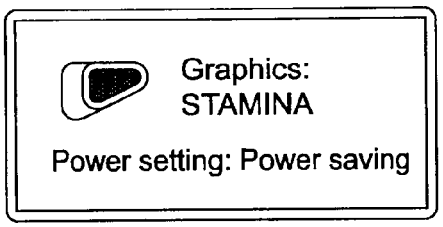
FIG. 24 is a diagram showing an example of a message that indicates a completion of a power supply setting for the STAMINA mode in the embodiment of the present invention.

As shown in FIG. 7, in the case where the STAMINA mode is selected with the mode selection switch 7 (Step 81), the CPU 11 judges whether the current mode is the AUTO mode and the STAMINA mode (Step 82). When judging that the current mode is the AUTO mode and the STAMINA mode (Yes), the CPU 11 just changes the setting of the power supply option because the mode switching is unnecessary (Step 83), and displays a message indicating a setting completion (message (5)), to terminate the operation (Step 84). FIG. 24 is a diagram showing an example of the message (5) that indicates the setting completion of the power supply option for the STAMINA mode. In this case, the electric power saving is emphasized.

Figure 25:
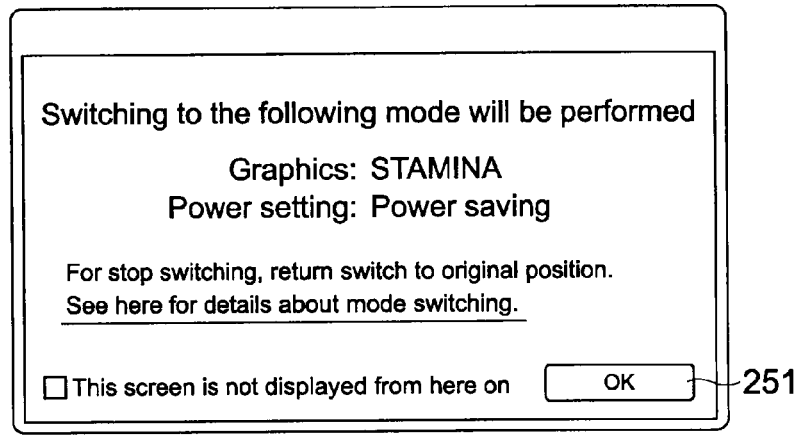
FIG. 25 is a diagram showing an example of a dialog for confirming with the user whether it is possible to perform switching to the STAMINA mode by the PC in the embodiment of the present invention.

In Step 82, when judging that the current mode is not the AUTO mode and the STAMINA mode (No), the CPU 11 displays a dialog (message (6)) for confirming with the user whether the current mode may be switched to the STAMINA mode (Step 85). FIG. 25 is a diagram showing an example of the dialog (message (6)). As shown in FIG. 25, on the dialog, an OK button 251 for permitting the switching to the STAMINA mode is displayed.

The subsequent operation is the same as the processes of Steps 66 to 69 of (A) of FIG. 6 (Steps 86 to 89). That is, in the case where the switching with the mode selection switch 7 is not canceled, and the OK button 251 on the dialog is clicked, the CPU 11 switches the current mode to the STAMINA mode.

Figure 8:
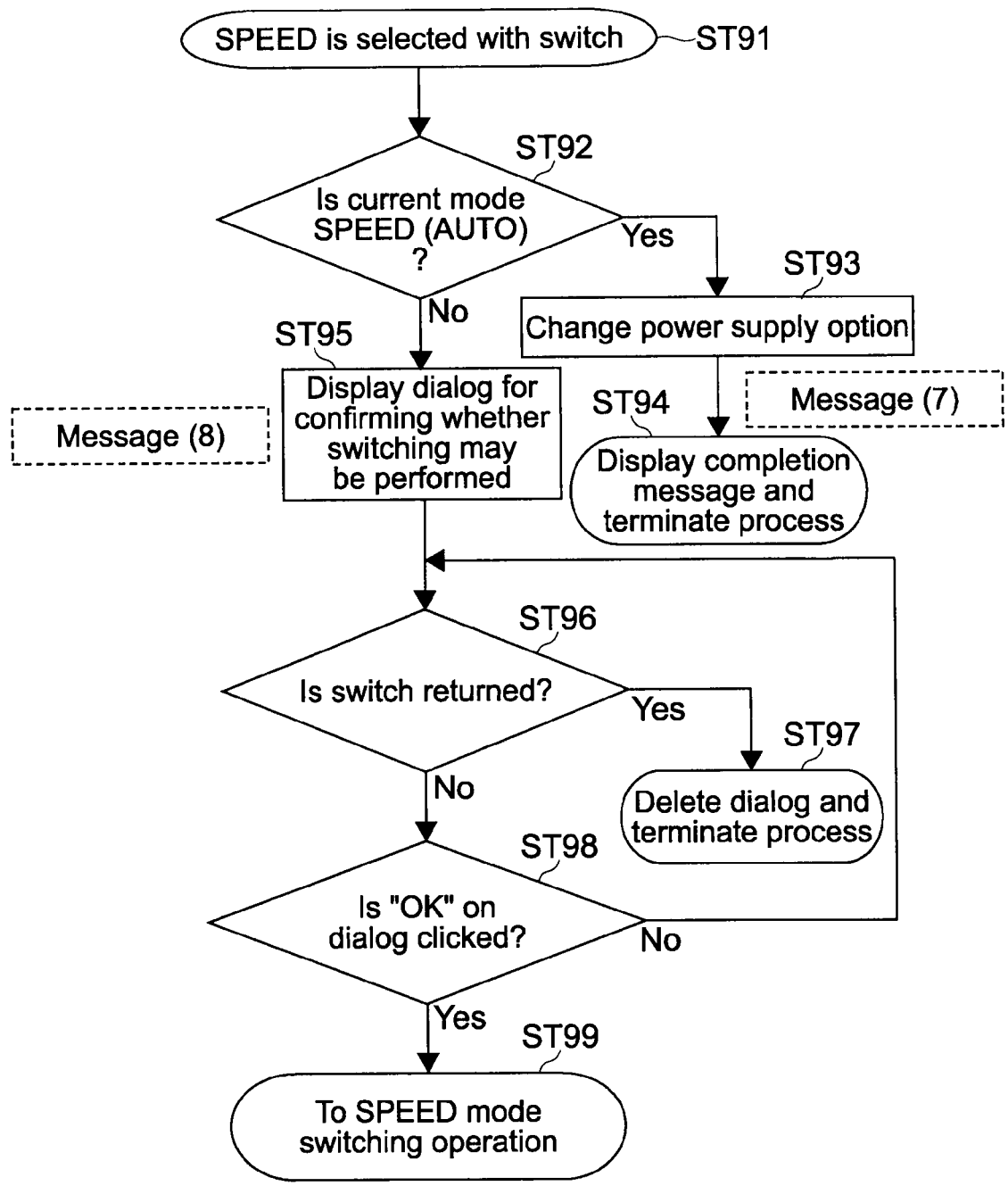
FIG. 8 is a flowchart showing the operation flow of the PC in the case where a SPEED mode is selected with the mode selection switch in the embodiment of the present invention.
Figure 26:
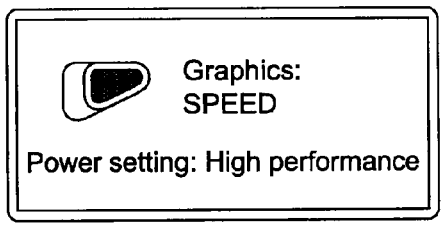
FIG. 26 is a diagram showing an example of a message that indicates a completion of a power supply setting for the SPEED mode in the embodiment of the present invention.
Figure 27:
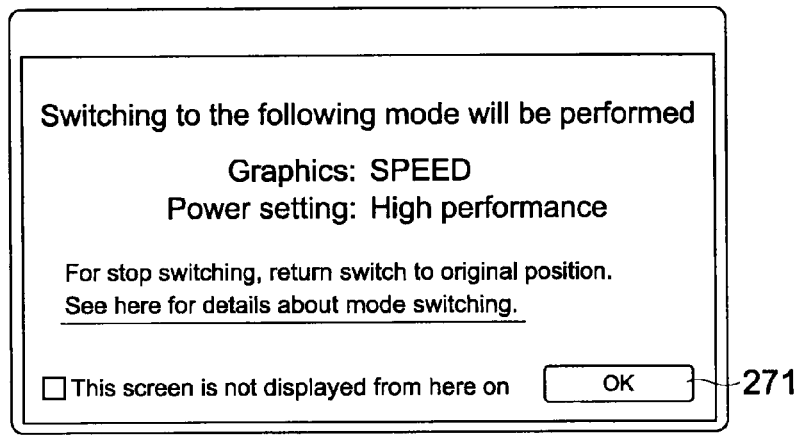
FIG. 27 is a diagram showing an example of a dialog for confirming with the user whether it is possible to perform switching to the SPEED mode by the PC in the embodiment of the present invention.

FIG. 8 is a flowchart showing the operation flow of the PC 100 in the case where the switching to SPEED mode is performed with the mode selection switch 7. The operation flow of this case is different from that shown in FIG. 7 only in the mode. That is, the SPEED mode is involved in the operation shown in FIG. 8, while the STAMINA mode is involved in the operation shown in FIG. 7. FIG. 26 is a diagram showing an example of a message (7) that indicates the setting completion of the power supply option for the SPEED mode. In this case, the drawing process performance is emphasized. FIG. 27 is a diagram showing an example of a dialog (message (8)) for confirming with the user whether the switching to the SPEED mode may be performed. As shown in FIG. 27, on the dialog, an OK button 271 for permitting the switching to the SPEED mode is displayed.

(Operation at Time When Various Events Occur in Respective Modes)

Subsequently, in the aforementioned modes, the operations of the PC 100 in the case where events occur that require the switching of the modes will be described.

Figure 9:
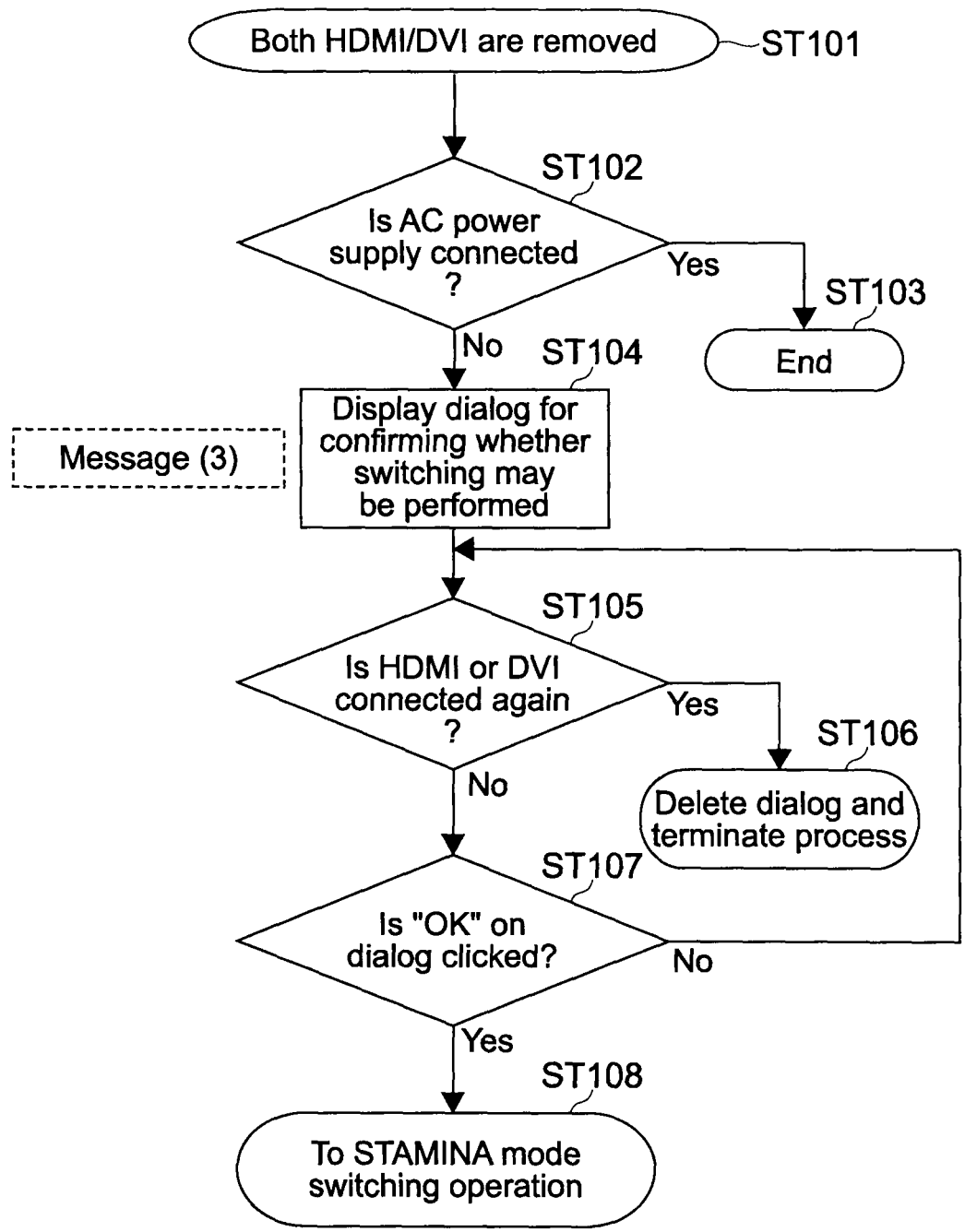
FIG. 9 is a flowchart showing the operation flow of the PC in the case where both an HDMI connection and a DVI connection are released in the AUTO mode in the embodiment of the present invention.

FIG. 9 is a flowchart showing the operation flow of the PC 100 in the case where both the HDMI connection and the DVI connection are released (the cables are removed from both the HDMI connector 2*j* and the DVI connector 2*k*) in the AUTO mode.

As shown in FIG. 9, when both the HDMI connection and the DVI connection are released (Step 101), the CPU 11 judges whether the AC adapter 5 is connected to the DC jack 28 (Step 102).

When judging that the AC adapter 5 is connected (Yes), the CPU 11 terminates the process because the mode switching is unnecessary (Step 103).

When judging that the AC adapter 5 is not connected (No), the CPU 11 displays a dialog (message (3)) for confirming with the user whether the switching to the STAMINA mode may be performed as shown in FIG. 22 because the current mode is the AUTO and SPEED modes (Step 104).

Subsequently, the CPU 11 judges whether the external monitor is connected to the HDMI connector 2j or the DVI connector 2k again (Step 105). In the case where the connection to the HDMI connector 2j or the DVI connector 2k is performed (Yes), the CPU 11 deletes the dialog and terminates the process (Step 106). That is, the user can cancel the mode switching process by inserting the HDMI cable or the DVI cable to the HDMI connector 2j or the DVI connector 2k again.

In the case where the external monitor is not connected to the HDMI connector 2j or the DVI connector 2k again (No), the CPU 11 judges whether the OK button 221 on the dialog is clicked or not (Step 107). When judging that the OK button 221 is clicked (Yes), the CPU 11 switches the current mode to the STAMINA mode (Step 108).

Figure 10:
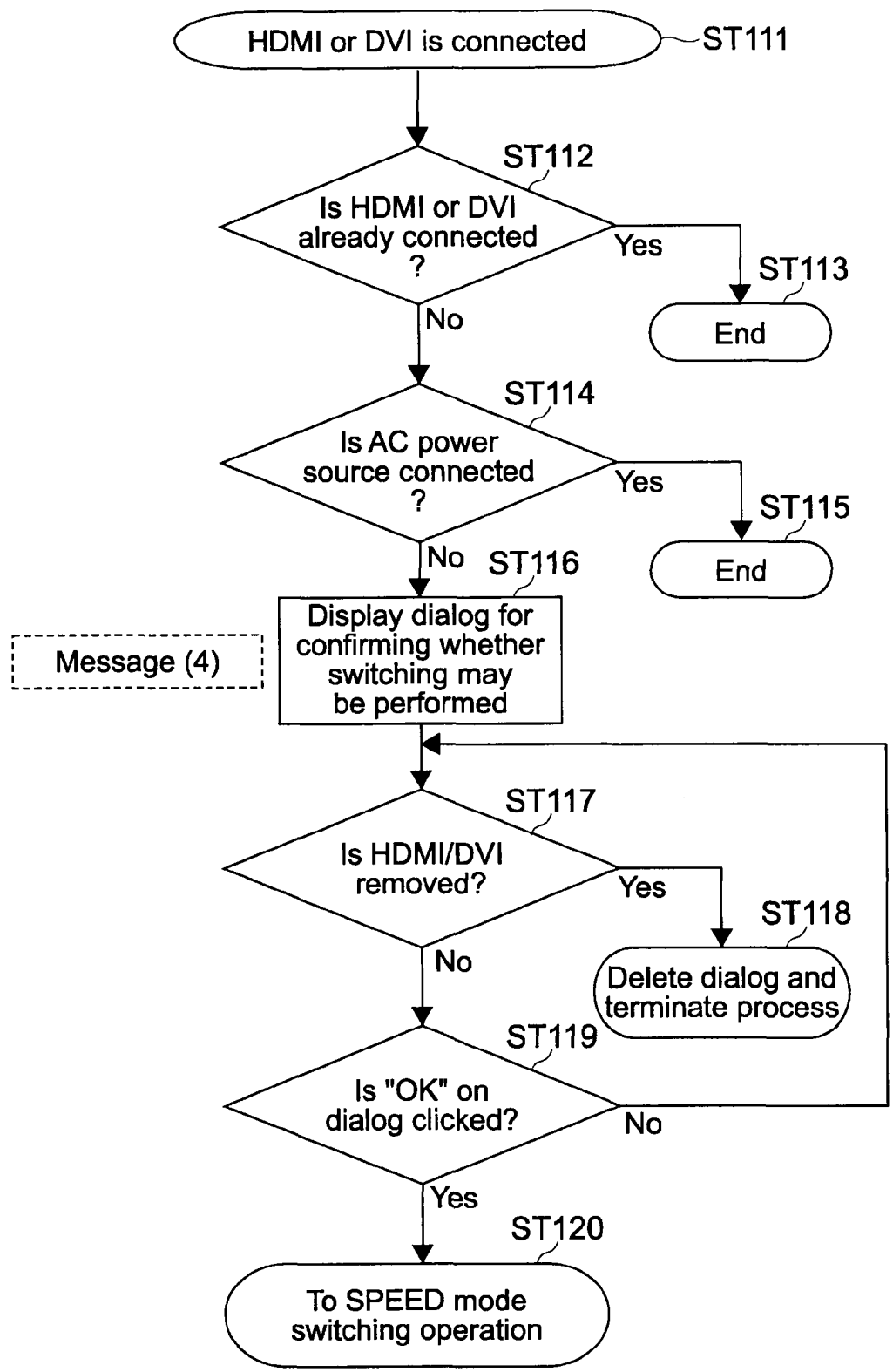
FIG. 10 is a flowchart showing the operation flow of the PC in the case where the external monitor is connected to the HDMI connector or the DVI connector in the AUTO mode in the embodiment of the present invention.

FIG. 10 is a flowchart showing the operation flow of the PC in the case where the external monitor is connected to the HDMI connector 2j or the DVI connector 2k in the AUTO mode.

As shown in FIG. 10, when the external monitor is connected to the HDMI connector 2j or the DVI connector 2k (Step 111), the CPU 11 judges whether another external monitor is already connected to the remaining connector (Step 112). When judging that another external monitor is connected to the remaining connector (Yes), the CPU 11 terminates the process, because the current mode is the AUTO and SPEED modes, and the mode switching is unnecessary (Step 113).

When judging that another external monitor is not connected to the remaining connector (No), the CPU 11 judges whether the AC adapter 5 is connected to the DC jack 28 or not (Step 114). When the CPU 11 judges that the AC adapter 5 is connected (Yes), the CPU 11 terminates the process, because the current mode is the AUTO and SPEED modes, and the mode switching is unnecessary (Step 115).

When judging that the AC adapter 5 is not connected (No), as shown in FIG. 23, the CPU 11 displays the dialog (message (4)) for confirming with the user whether the switching to the SPEED mode may be performed or not (Step 116).

Then, the CPU 11 judges whether the HDMI cable or the DVI cable that is connected to the HDMI connector 2j or the DVI connector 2k in Step 111 is removed or not (whether the connection with the external monitor is released or not) (Step 117). When judging that the cable is removed (Yes), the CPU 11 deletes the dialog and terminates the process (Step 118). That is, the user can cancel the mode switching process by removing the HDMI cable or the DVI cable that is once inserted.

When judging that the cable is not removed from the HDMI connector 2j or the DVI connector 2k (No), the CPU 11 judges whether the OK button 231 is clicked or not on the dialog (Step 119). When judging that the OK button 231 is clicked (Yes), the CPU 11 switches the current mode to the SPEED mode (Step 120).

Figure 11:
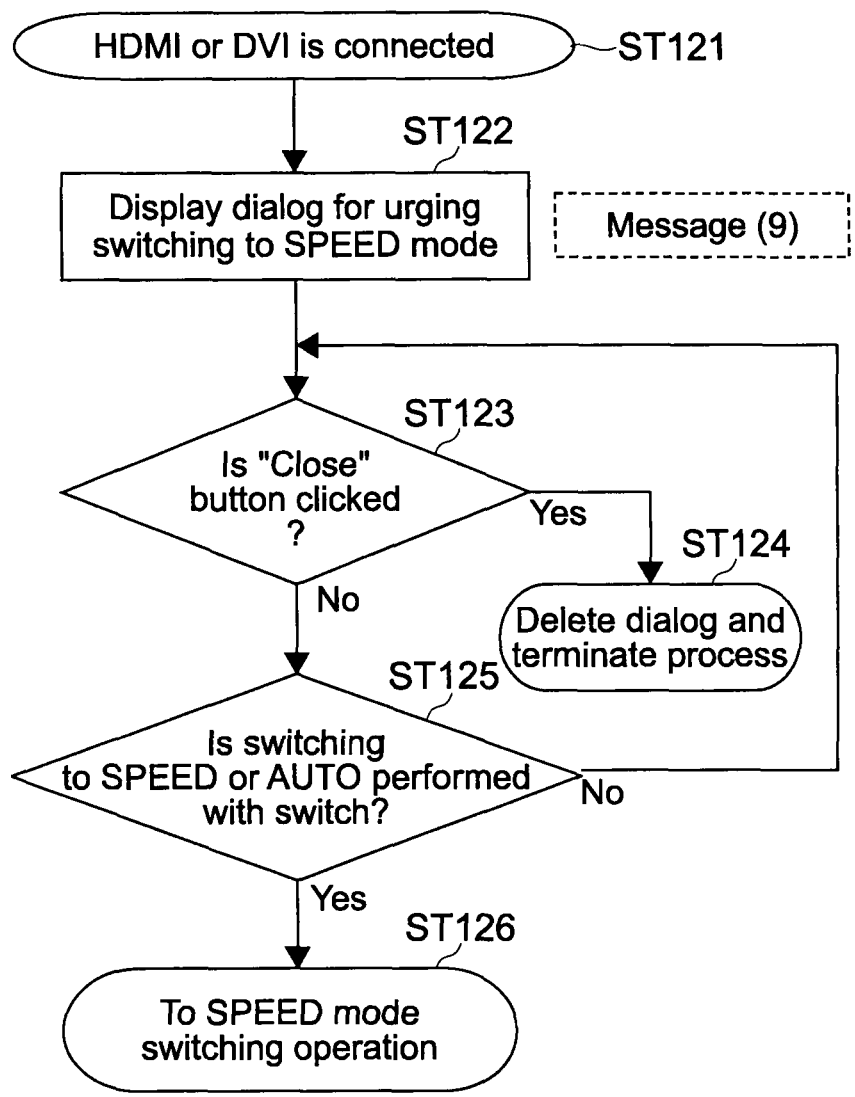
FIG. 11 is a flowchart showing the operation flow of the PC in the case where the external monitor is connected to the HDMI connector or the DVI connector in the STAMINA mode in the embodiment of the present invention.

FIG. 11 is a flowchart showing the operation flow of the PC in the case where the external monitor is connected to the HDMI connector 2j or the DVI connector 2k in the STAMINA mode manually set.

Figure 28:
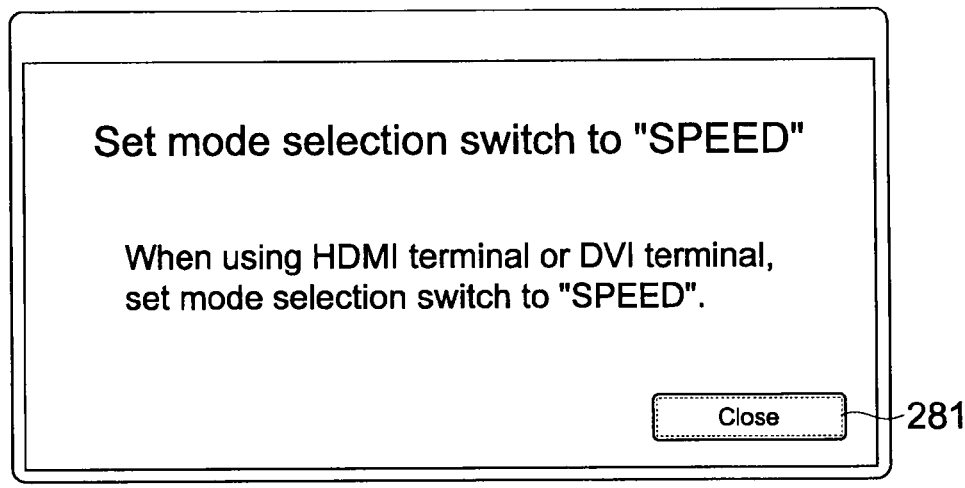
FIG. 28 is a diagram showing an example of a dialog for urging the user to perform the switching to the SPEED mode by the PC in the embodiment of the present invention.

As shown in FIG. 11, when the external monitor is connected to the HDMI connector 2j or the DVI connector 2k in the STAMINA mode, the CPU 11 displays a dialog (message (9)) for urging the switching to the SPEED mode (Step 122). FIG. 28 is a diagram showing an example of the dialog (message (9)). As shown in FIG. 28, in the dialog, a "close" button 281 is displayed along with a message that urges the user to switch the current mode to the SPEED mode with the mode selection switch 7.

Subsequently, the CPU 11 judges whether the "close" button 281 is clicked or not on the dialog (Step 123). In the case where the "close" button 281 is clicked (Yes), the CPU 11 deletes the dialog and terminates the process (Step 124).

Then, the CPU 11 judges whether the user performs the switching to the SPEED mode or the AUTO mode with the mode selection switch 7 (Step 125). When the switching is performed with the mode selection switch 7 (Yes), the CPU 11 operates to switch the current mode to the SPEED mode (Step 126).

Figure 12:
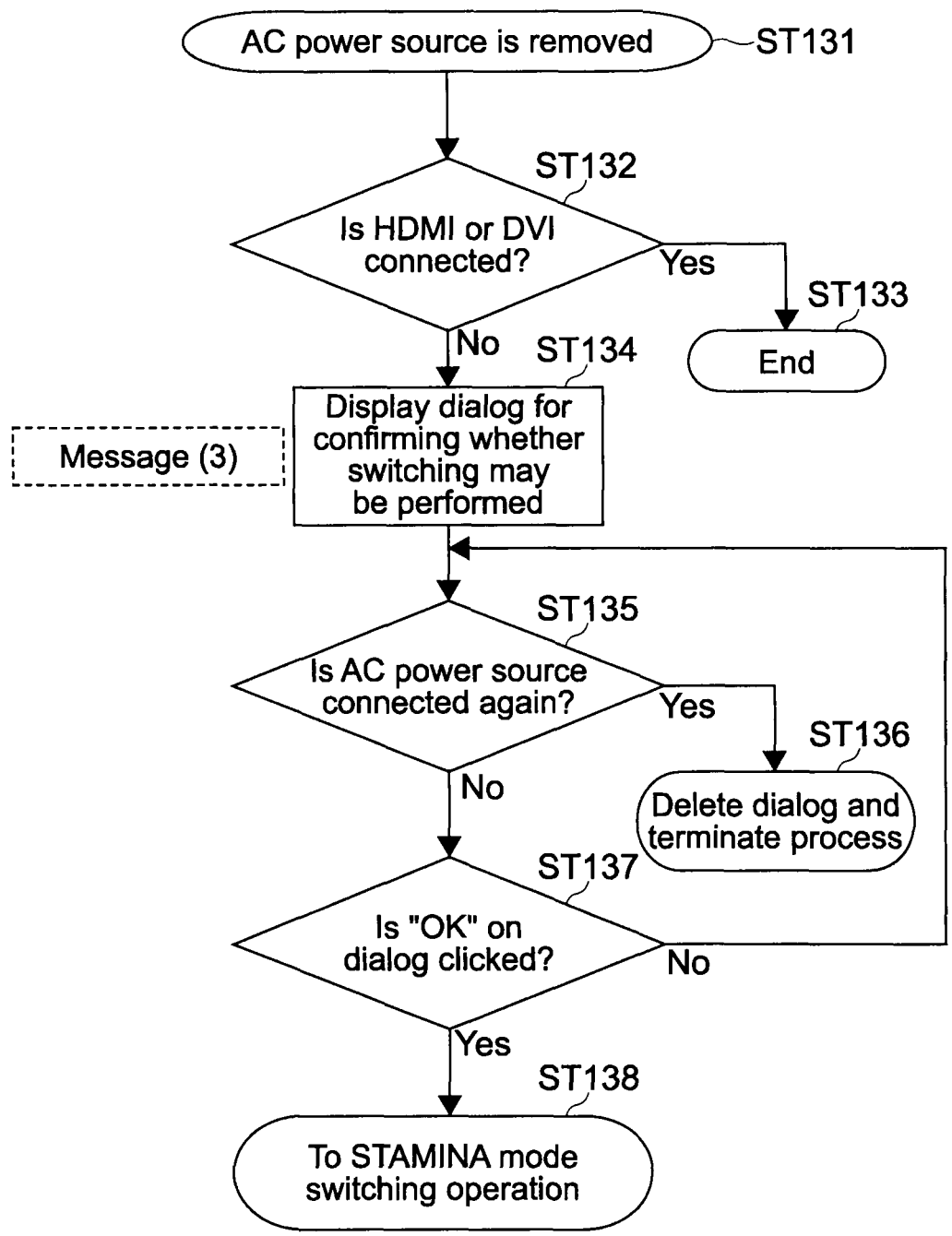
FIG. 12 is a flowchart showing the operation flow of the PC in the case where the AC adapter connected in the AUTO mode is removed in the embodiment of the present invention.

FIG. 12 is a flowchart showing the operation flow of the PC in the case where the AC adapter 5 connected in the AUTO mode is removed.

As shown in FIG. 12, when the AC adapter 5 is removed (Step 131), the CPU 11 judges whether the external monitor is connected to the HDMI connector 2j or the DVI connector 2k (Step 132). When judging that the external monitor is connected to the HDMI connector 2j or the DVI connector 2k (Yes), the CPU 11 terminates the process, because the current mode is the SPEED mode, and the mode switching is unnecessary (Step 133).

When judging that the external monitor is not connected to the HDMI connector 2j or the DVI connector 2k (No), as shown in FIG. 22, the CPU 11 displays the dialog (message (3)) for confirming with the user whether the switching to the STAMINA mode may be performed or not (Step 134).

Subsequently, the CPU 11 judges whether the AC adapter is connected again (Step 135). In the case where the AC adapter is connected again (Yes), the CPU 11 deletes the dialog and terminates the process (Step 136).

In the case where the AC adapter 5 is not connected (No), the CPU 11 judges whether the OK button 221 is clicked on the dialog (Step 137). When judging that the OK button 221 is clicked (Yes), the CPU 11 operates to switch the current mode to the STAMINA mode (Step 138).

Figure 13:
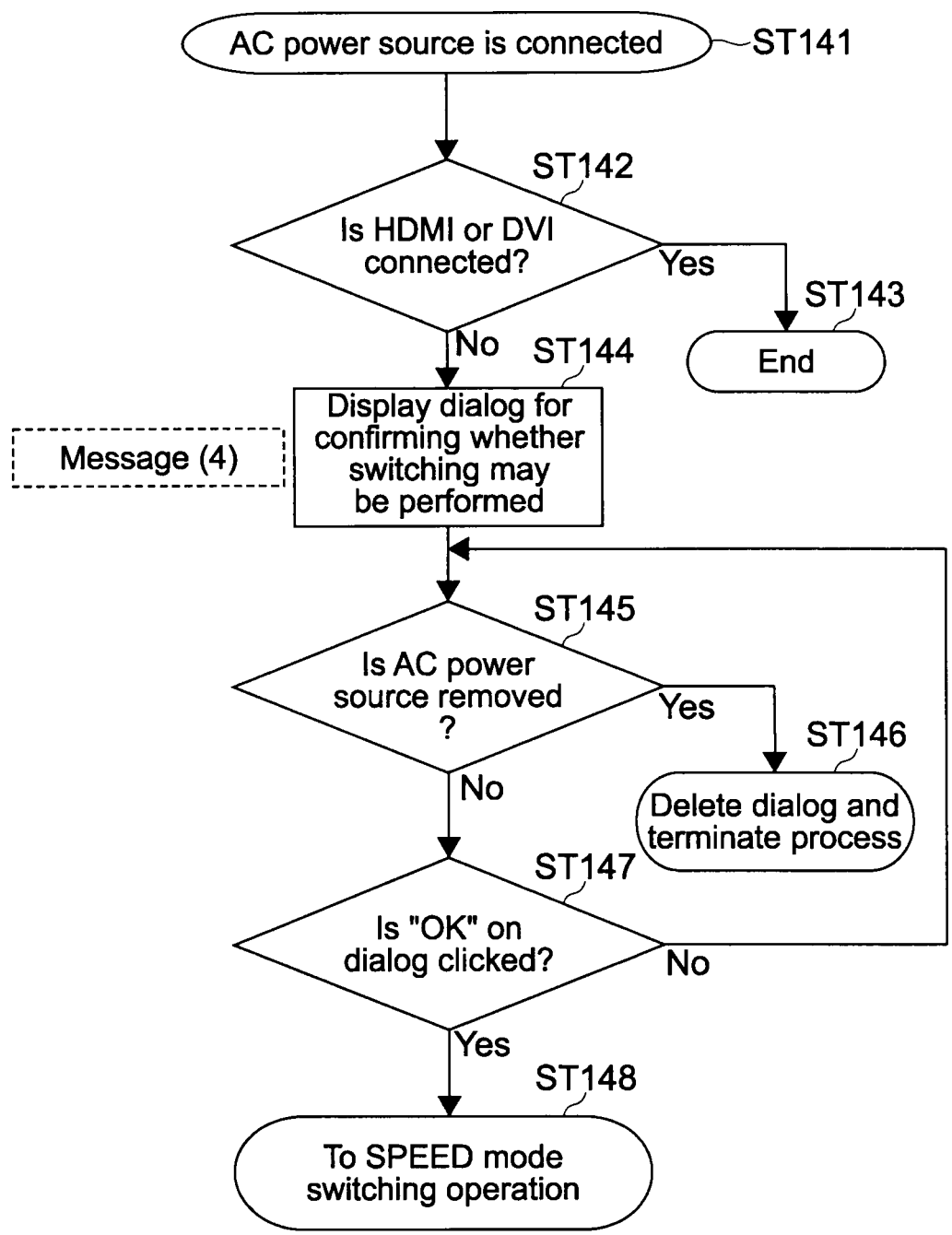
FIG. 13 is a flowchart showing the operation flow of the PC in the case where the AC adapter that is not connected in the AUTO mode is connected in the embodiment of the present invention.

FIG. 13 is a flowchart showing the operation flow of the PC in the case where the AC adapter 5 that is not connected in the AUTO mode is connected.

As shown in FIG. 13, when the AC adapter 5 is connected (Step 141), the CPU 11 judges whether the external monitor is connected to the HDMI connector 2j or the DVI connector 2k (Step 142). When judging that the external monitor is connected to the HDMI connector 2j or the DVI connector 2k (Yes), the CPU terminates the process, because the current mode is the SPEED mode, and the mode switching is unnecessary (Step 143).

When judging that the external monitor is not connected to the HDMI connector 2j or the DVI connector 2k (No), the CPU 11 displays the dialog (message (4)) for confirming with the user whether the switching to the SPEED mode may be performed as shown in FIG. 23 (Step 144).

Subsequently, the CPU 11 judges whether the AC adapter 5 that has been connected once is removed or not (Step 145).

In the case where the AC adapter 5 is removed (Yes), the CPU 11 deletes the dialog and terminates the process (Step 146).

In the case where the AC adapter 5 is not removed (No), the CPU 11 judges whether the OK button 231 is clicked on the dialog (Step 147). When judging that the OK button 231 is clicked (Yes), the CPU 11 operates to switch the current mode to the SPEED mode (Step 148).

(Details of Switching Operation to STAMINA Mode)

Figure 14:
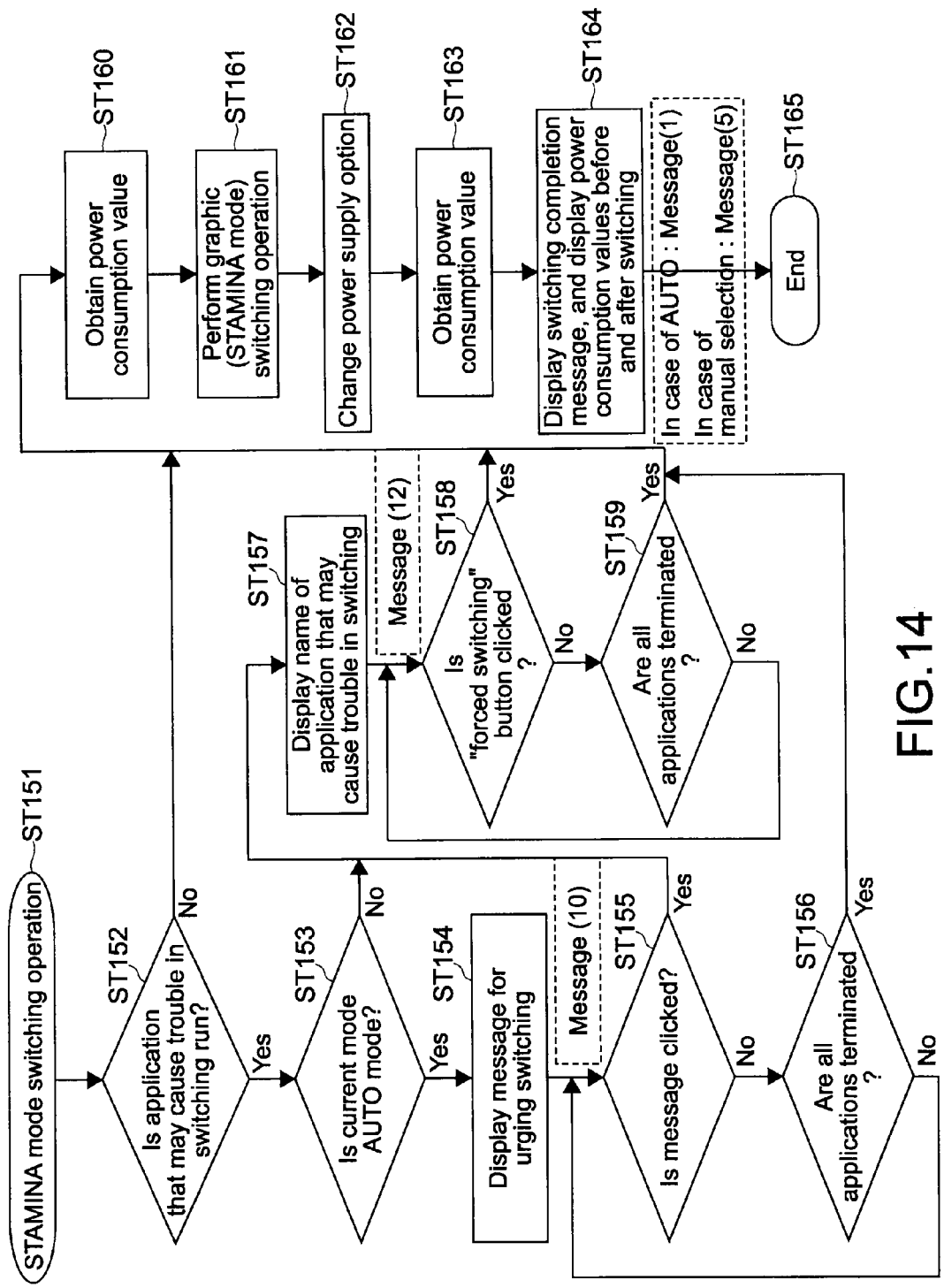
FIG. 14 is a flowchart showing the switching operation flow of the PC to the STAMINA mode in the embodiment of the present invention.

Next, the details of the switching operation to the STAMINA mode will be described. FIG. 14 is a flowchart showing the switching operation flow to the STAMINA mode. The operation of FIG. 14 includes an operation during the AUTO mode and an operation during the SPEED mode manually selected.

As shown in FIG. 14, when a switching process to the STAMINA mode is generated (Step 151), the CPU 11 judges whether an application that may cause a trouble in the switching is run or not (Step 152). Here, the application that may cause a trouble in the switching refers to a reproduction application for a movie, a DVD, or the like, a game application, or the like, in particular, an application that uses the external graphics chip 20. For example, a mailer, a document creation application, a table creation application, or the like does not cause a trouble, even if the switching is performed during the execution of the application.

When judging that the application that may cause a trouble in the switching is run (Yes), the CPU 11 judges whether the current mode is the AUTO mode or not (Step 153). When judging that the current mode is the AUTO mode (Yes), the CPU 11 displays a message (message (10)) that urges the switching to the STAMINA mode (Step 154).

Figure 29:
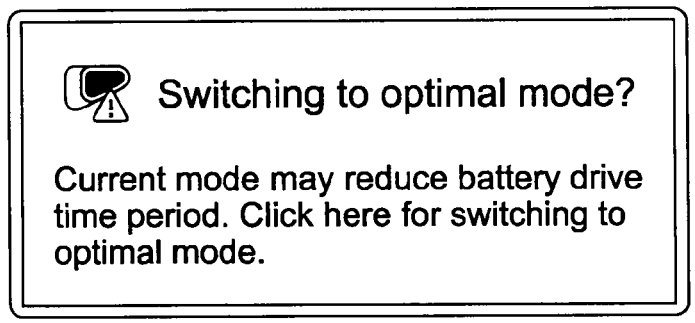
FIG. 29 is a diagram showing an example of a dialog for urging the user to perform the switching to the STAMINA mode by the PC in the case where the application is run that may cause a trouble due to a mode switching in the embodiment of the present invention.

FIG. 29 is a diagram showing an example of the message (10) that urges the switching. As shown in FIG. 29, the message indicates that the drive time period of the battery 27 is shortened in the current mode and indicates that the message concerned only has to be clicked to perform switching to the STAMINA mode.

Subsequently, the CPU 11 judges whether the message concerned is clicked (Step 155). When judging that the message is clicked (Yes), the CPU 11 displays the name of the application that may cause a trouble in the switching (Step 157). In the case where there is a plurality of applications that may cause a trouble in the switching, the names of those applications are displayed.

Figure 31:
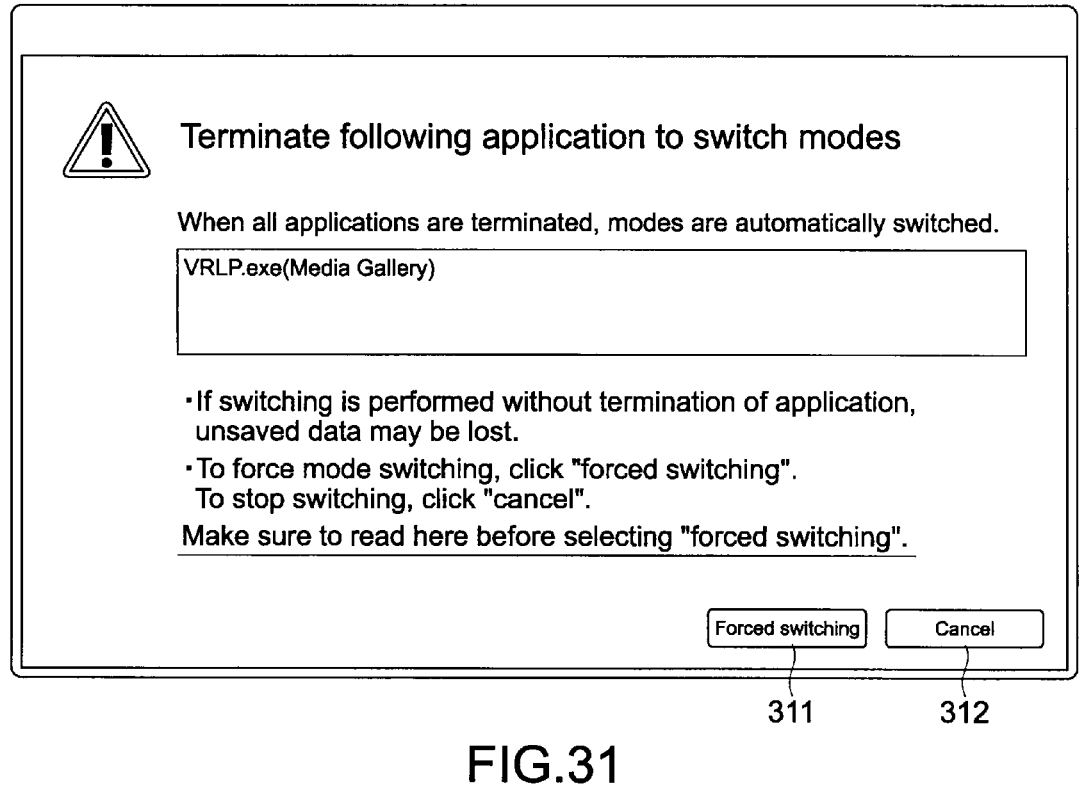
FIG. 31 is a diagram showing an example of a dialog for indicating, by the PC, a name of the application that may cause the trouble due to the mode switching in the embodiment of the present invention.

FIG. 31 is a diagram showing an example of a dialog that shows the name of the application. As shown in FIG. 31, in addition to the name of the application that may cause a trouble in the switching, a message that urges the termination of the application, a forced switching button 311, and a cancel button 312 are displayed on the dialog. The forced switching button 311 is used to give an instruction that the mode switching is forced to be performed with knowledge of a trouble. The cancel button 312 is used to cancel the switching.

Subsequently, the CPU 11 judges whether the forced switching button 311 is clicked on the dialog (Step 158). When judging that the forced switching button 311 is clicked (Yes), the CPU 11 obtains a power consumption value at that time by using the wattmeter 29 (Step 160).

Then, the CPU 11 performs the switching process to the STAMINA mode, that is, a switching process from the external graphics chip 20 to the embedded graphics chip 15 (Step 161), and changes the setting of the power supply option (Step 162).

Then, the CPU 11 obtains the power consumption value after the switching of the mode by using the wattmeter 29 (Step 163).

Subsequently, the CPU 11 displays the message (1) that indicates the completion of the mode switching, and displays the obtained power consumption values before and after the switching (Step 164).

In Step 153, when judging that the current mode is not the AUTO mode (No), that is, the SPEED mode manually selected, the CPU 11 subsequently performs a process of Step 157. In this case, the message displayed at the time of the final completion of the switching is the message (5).

In addition, in the case where the message is not clicked in Step 155 (No), and in the case where the forced switching button 311 is not clicked in Step 158 (No), the CPU 11 judges whether the applications that may cause a trouble in the switching are entirely terminated (Steps 156 and 159). When judging that the applications are terminated, the CPU 11 then performs the process of Step 160.

As described above, the CPU 11 displays the name of the application that may cause a trouble in the mode switching to thereby alert the user, with the result that the data of the application in execution can be prevented from being damaged or erased, and the mode switching can be performed safely. Further, in the AUTO mode, the CPU 11 displays the message for urging the switching before displaying the name of the application that may cause a trouble, which can give the user an opportunity to terminate the application by him/herself.

When the CPU 11 displays the obtained power consumption values according one embodiment of the present invention, the CPU 11 may display the obtained power consumption values at least before or after the switching. Further, the CPU 11 may display a difference between the obtained power consumption values before the switching and after the switching. Also, the CPU 11 may continuously display the obtained power consumption values before, during and after the switching.

(Details of Switching Operation to SPEED Mode)

Figure 15:
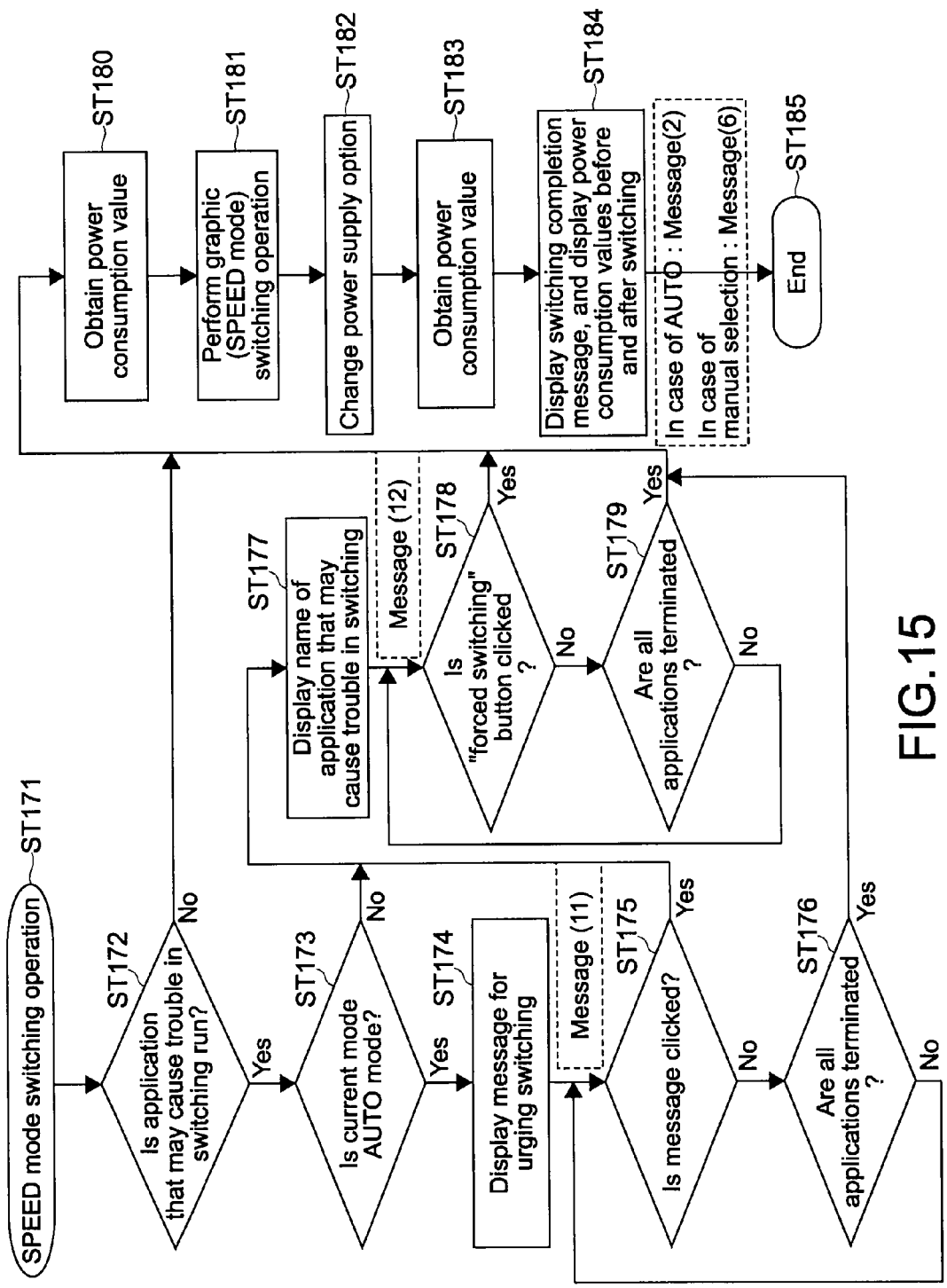
FIG. 15 is a flowchart showing the switching operation flow of the PC to the SPEED mode in the embodiment of the present invention.
Figure 30:
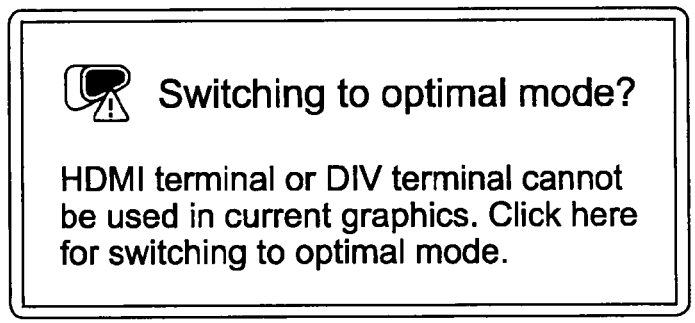
FIG. 30 is a diagram showing an example of a dialog for urging the user to perform the switching to the SPEED mode by the PC in the case where the application is run that may cause the trouble due to the mode switching in the embodiment of the present invention.

FIG. 15 is a flowchart showing the switching operation to the SPEED mode. The process shown in FIG. 15 is different, only in the mode, from the switching process to the STAMINA mode that is shown in FIG. 14. That is, the SPEED mode is involved in the process shown in FIG. 15, while the STAMINA mode is involved in the process shown in FIG. 14, so a description thereof will be omitted. FIG. 30 is a diagram showing an example of a message (message (11)) that urges the switching that is displayed during the AUTO mode in the switching process to the SPEED mode. As shown in FIG. 30, the message indicates that it may be impossible to use the HDMI connector 2j or the DVI connector 2k in the current mode and indicates that the message only has to be clicked to perform switching to the SPEED mode. In addition, in FIG. 15, the message that is finally displayed in the case where the mode is switched in execution of the AUTO mode is the message (2), and the message that is finally displayed in the case where the mode is switched during the execution of the STAMINA mode manually selected is the message (6).

(Process of Blocks at Time When Various Operations are Performed)

Next, a description will be given on the flow of a signal among blocks of the software and the hardware of the PC 100 in the processes described above.

Figure 16:
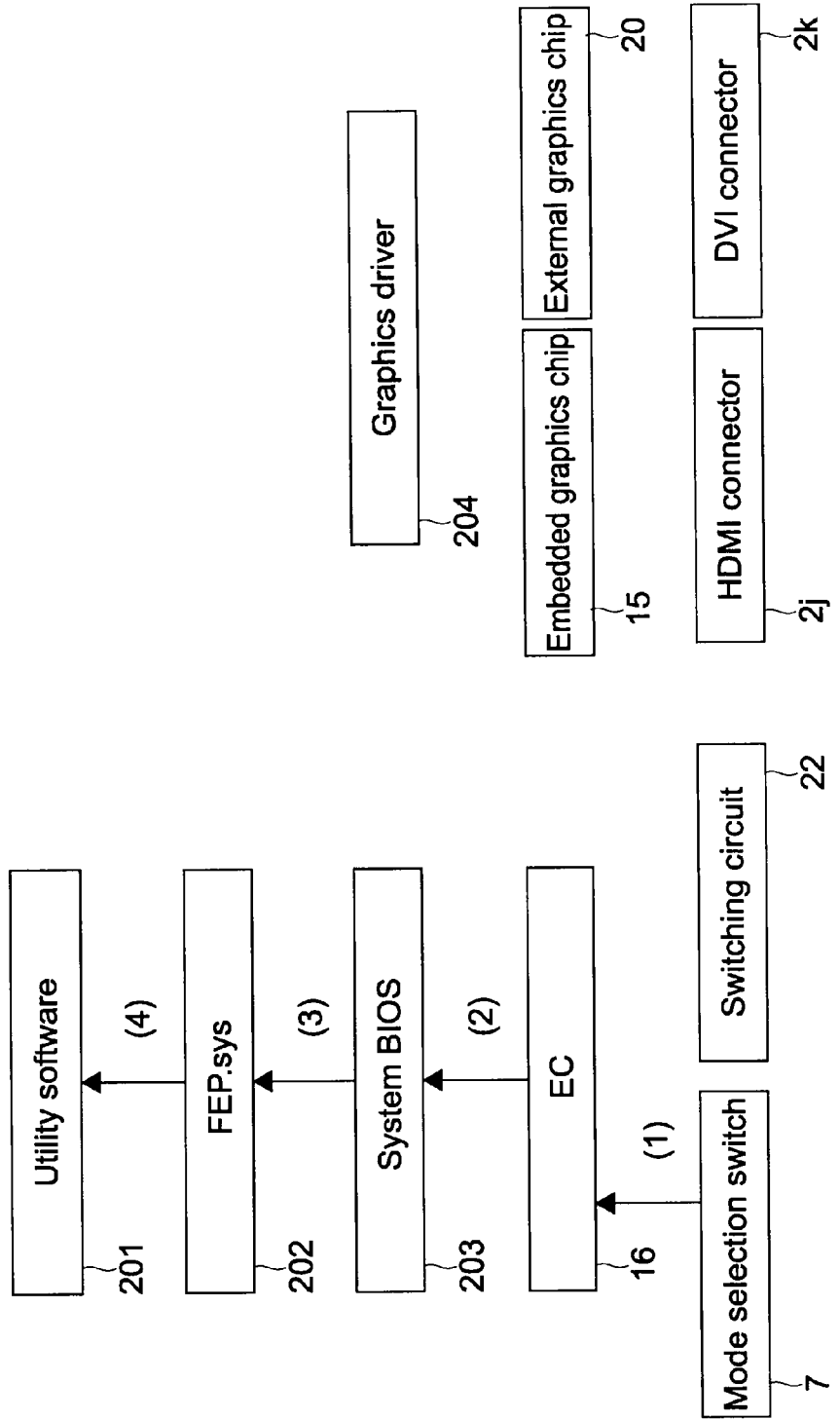
FIG. 16 is a diagram showing the process flow of blocks in a detection process of the switching with the mode selection switch in the embodiment of the present invention.

FIG. 16 is a diagram showing the process flow of blocks in a detection process of the switching with the mode selection switch 7. FIGS. 16 to 19 show, as common blocks, utility software 201, an FEP.sys 202, a system BIOS 203, the EC 16, the mode selection switch 7, the switching circuit 22, the LED display 8, a graphics driver 204, the embedded graphics chip 15, the external graphics chip 20, the HDMI connector 2j, and the DVI connector 2k.

As shown in FIG. 16, in the case where the switching is performed with the mode selection switch 7, the switching is transmitted from the mode selection switch 7 to the EC 16 ((1) in FIG. 16), and then transmitted to the utility software 201 through the system BIOS 203 and the FEP.sys 202 ((2) to (4) in FIG. 16). Thus, the utility software 201 can display the various dialogs (messages) described above.

Figure 17:
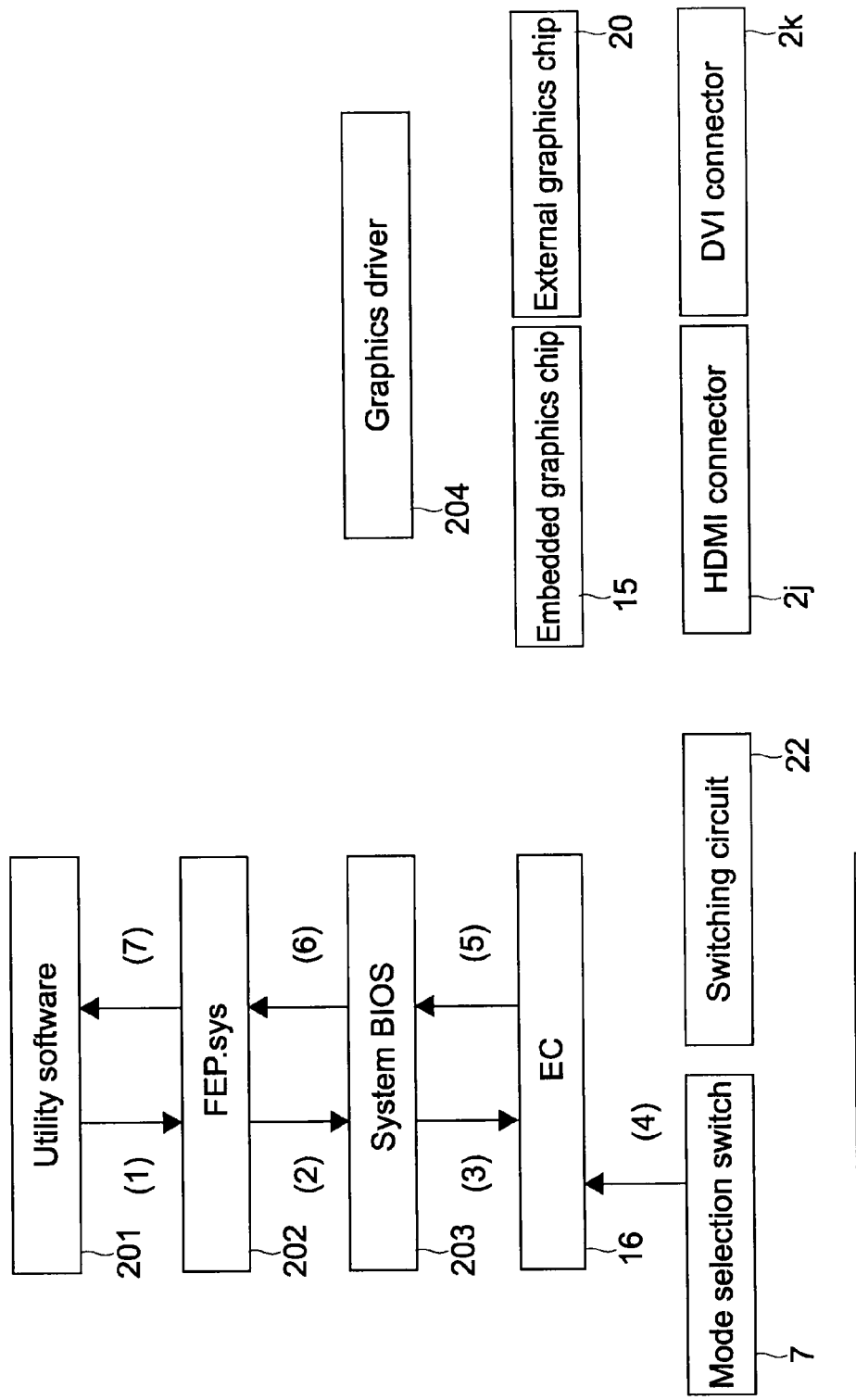
FIG. 17 is a diagram showing the process flow of blocks in a detection process of a current switch position for the mode selection switch in the embodiment of the present invention.

FIG. 17 is a diagram showing the process flow of blocks in a detection process of a current switch position for the mode selection switch 7.

As shown in FIG. 17, the utility software 201 inquires of the EC 16 through the FEP.sys 202 and the system BIOS 203 as to the current switch position in the mode selection switch 7 ((1) to (3) in FIG. 17). In response to the inquiry, the EC 16 detects the current switch position from the mode selection switch 7 ((4) in FIG. 17), and transmits a result of the detection to the utility software 201 through the system BIOS 203 and the FEP.sys 202 ((5) to (7) in FIG. 17).

Figure 18:
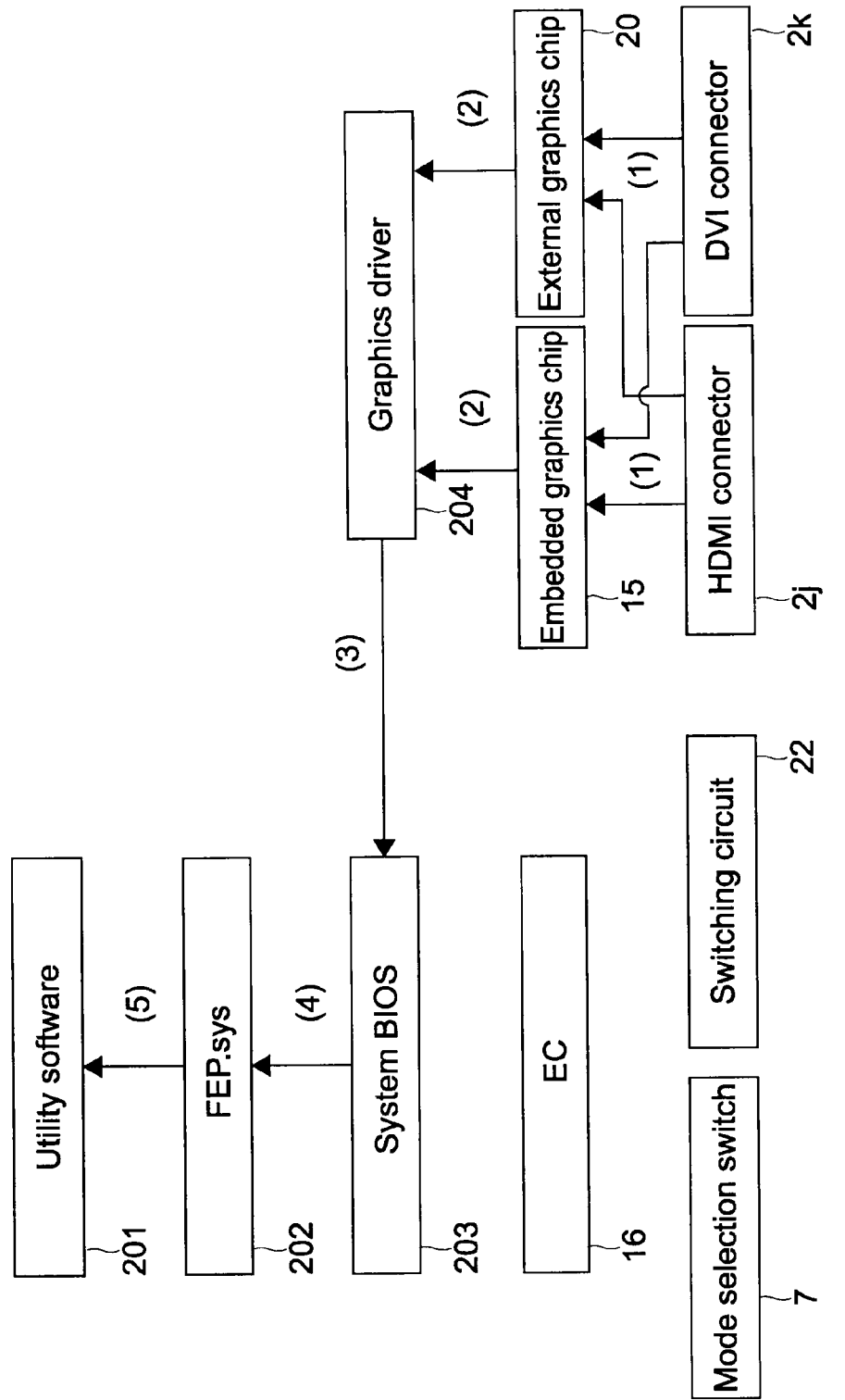
FIG. 18 is a diagram showing the process flow of blocks in a detection process of the connection between the external monitor and the HDMI connector or the DVI connector in the embodiment of the present invention.

FIG. 18 is a diagram showing the process flow of blocks in a detection process of the connection between the external monitor and the HDMI connector 2j or the DVI connector 2k.

As shown in FIG. 18, in the case where the connection to the HDMI connector 2j or the DVI connector 2k is conducted, the fact is transmitted to the embedded graphics chip 15 or the external graphics chip 20 ((1) in FIG. 18), and further transmitted to the graphics driver 204 ((2) in FIG. 18). The graphics driver 204 transmits the connection to the system BIOS 203 ((3) in FIG. 18), and the system BIOS 203 transmits the connection to the utility software 201 through the FEP.sys 202 ((4) and (5) in FIG. 18).

Figure 19:
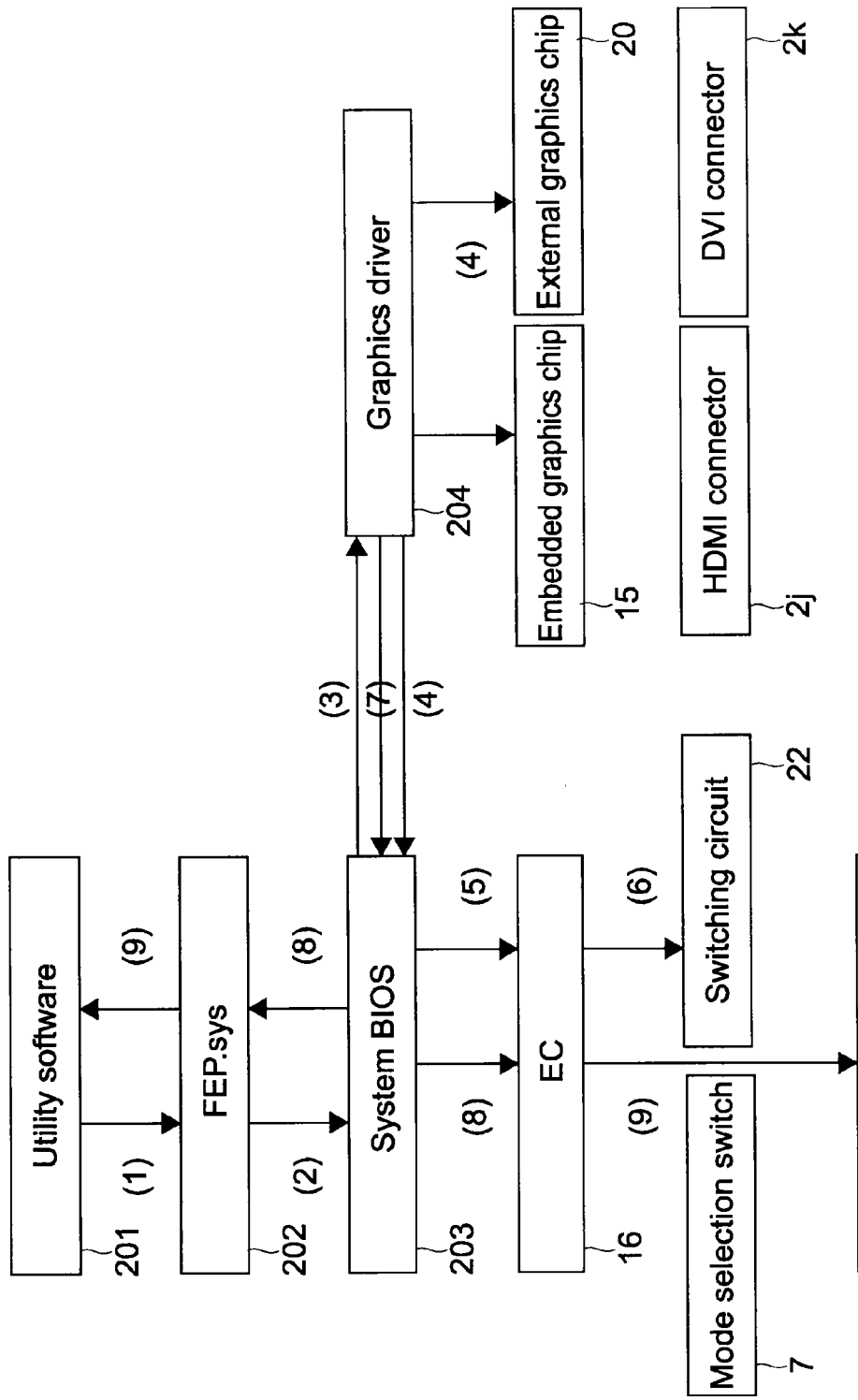
FIG. 19 is a diagram showing the process flow of blocks at the time when the graphics chips are switched in the embodiment of the present invention.

FIG. 19 is a diagram showing the process flow of blocks at the time when the graphics chips are switched.

As shown in FIG. 19, for example, when an event of clicking the OK button on the dialog is generated, the utility software 201 transmits an instruction for switching the graphic chips to the graphics driver through the FEP.sys 202 and the system BIOS 203 ((1) to (3) in FIG. 19).

The graphics driver 204 performs initialization of the embedded graphics chip 15 or the external graphics chip 20 or turns on and off of the power thereof ((4) in FIG. 19), for example, and transmits an instruction for switching the graphics chips to the EC 16 through the system BIOS 203 ((4) and (5) in FIG. 19). Based on the instruction, the EC 16 causes the switching circuit 22 to switch the graphics chips ((6) in FIG. 19).

Then, the graphics driver 204 transmits the completion of the switching process of the graphics chips to the system BIOS 203 ((7) in FIG. 19). The system BIOS 203 notifies the utility software 201 of the completion through the FEP.sys 202 ((8) and (9) in FIG. 19). Thus, the utility software 201 displays the message that indicates the setting completion of the power supply option.

On the other hand, the system BIOS 203 also notifies the EC 16 of the completion. Based on the notification, the EC 16 causes the LED display 8 in accordance with the switched mode to light up.

(Conclusion)

As described above, according to this embodiment, the PC 100 prepares the AUTO mode in addition to the STAMINA and SPEED modes, and therefore can automatically switch the embedded graphics chip 15 and the external graphics chip 20 in accordance with the connection condition to the external monitor with the HDMI or the DVI or a connection condition of the AC adapter 5. Thus, the PC 100 can switch the two graphics chips safely and easily in accordance with the use purpose of the user. Further, if the switching of the modes may cause a trouble in the operation of the application, the PC 100 displays the name of the application and urges the termination of the application. Therefore, the PC 100 can further assure the user of the safety.

MODIFIED EXAMPLE

The present invention is not limited to the above embodiment, and can be variously modified without departing from the gist of the present invention.

In the above embodiment, the PC 100 can perform the forced switching even after the name of the application that may cause a trouble due to the mode switching is displayed, but such a forced switching may be completely inhibited.

Further, in the case where the application that may cause a trouble due to the mode switching is present, the PC 100 may display a screen for urging an immediate termination of the application, or automatically store the task of the application and automatically terminate the application.

REFERENCE SIGNS LIST

2a operation input unit
2j HDMI connector
2k DVI connector
3 display
3a LCD
5 AC adapter
7 mode selection switch
8 (8a, 8b, 8c) LED display
11 CPU
15 embedded graphics chip
16 EC
20 external graphics chip
21 HDD
22 switching circuit
26 power supply circuit
27 battery
28 DC jack
100 PC
201 utility software
204 graphics driver
221, 231, 251, 271 OK button
311 forced switching button

The invention claimed is:

1. An information processing apparatus, comprising:
a first graphic processor having a first level of graphic performance;
a second graphic processor having a second level of graphic performance, which is greater than the first level of graphic performance;
control circuitry configured to
select one of the first graphic processor or the second graphic processor based on a determination of whether the information processing apparatus is capable of outputting data with the first level of graphic performance or the second level of graphic performance,
determine whether an application executed by the information processing apparatus is affected by the selection of the first graphic processor or the second graphic processor, and display a first notification that indicates the executed application is affected by the selection when the executed application is determined to be affected by the selection.

2. The information processing apparatus of claim 1, further comprising:
an interface compatible with the second level of graphic performance.

3. The information processing apparatus of claim 2, wherein the control circuitry is configured to determine that the information processing apparatus is capable of outputting data with the second level of graphic performance based on a detection that a connection is provided to the interface.

4. The information processing apparatus of claim 1, wherein the control circuitry is configured to determine that the information processing apparatus is capable of outputting data with the second level of graphic performance based on a determination that the application executed by the information processing apparatus is compatible with the second level of graphic performance.

5. The information processing apparatus of claim 1, wherein the control circuitry is configured to detect that the information processing apparatus is provided with power via an external power source based on a detection that power is being supplied via an external connection.

6. The information processing apparatus of claim 1, wherein the control circuitry is configured to select the second graphic processor when the information processing apparatus is determined to be capable of outputting data with the second level of graphic performance.

7. The information processing apparatus of claim 1, wherein the control circuitry is configured to select the second graphic processor when the information processing apparatus is detected to be provided with power via an external power source.

8. The information processing apparatus of claim 1, wherein the control circuitry is configured to select the first graphic processor when the information processing apparatus is determined not to be capable of outputting data with the second level of graphic performance.

9. The information processing apparatus of claim 1, wherein the control circuitry is configured to select the first graphic processor when the information processing apparatus is detected to be provided with power via a battery.

10. The information processing apparatus of claim 1, wherein the control circuitry is configured to display a second notification when the control circuitry switches between the first and second graphic processor.

11. The information processing apparatus of claim 1, wherein the control circuitry is configured to display a second notification when the controller selects either the first graphic processing module or the second graphic processing module.

12. The information processing apparatus of claim 11, wherein the control circuitry is configured to display a power consumption value upon selecting the first graphic processor or the second graphic processor.

13. The information processing apparatus of claim 11, wherein the second notification includes a button configured to receive a user input indicating whether the selection is accepted.

14. The information processing apparatus of claim 1, wherein the first notification includes a button configured to receive a user input indicating whether the selection is accepted.

15. The information processing apparatus of claim 1, wherein the control circuitry is configured to switch between the first and second graphic processors when the application affected by the selection is terminated.

16. The information processing apparatus of claim 1, wherein
the first graphic processor is configured to consume a first amount of power during operation, and
the second graphic processor is configured to consume a second amount of power, which is greater that the first amount of power, during operation.

17. The information processing apparatus of claim 16, wherein the control circuitry is configured to control the information processing apparatus to be in each of a first mode in which the control circuitry automatically selects one of the first and second graphic processors, a second mode, in which the first graphic processor is selected, and a user input is required to switch to the second graphic processor, and a third mode, in which the second graphic processor is selected, and a user input is required to switch to the first graphic processor.

18. The information processing apparatus of claim 17, further comprising:
a switch having a movable portion configured to be moved between three positions, each corresponding to one of the first, second and third modes.

19. The information processing apparatus of claim 18, wherein the switch is a triangular shaped switch, and the movable portion is configured to be moved between each corner of the triangle, and each corner of the triangle corresponds to one of the first, second and third modes.

20. The information processing apparatus of claim 17, wherein, when the information processing apparatus is in the second mode and the control circuitry determines that the information processing apparatus is capable of outputting data with the second level of graphic performance, the control circuitry is configured to control a display of the information processing apparatus to display a second notification.

21. The information processing apparatus of claim 17, wherein, when the information processing apparatus is in the third mode and the control circuitry detects that the information processing apparatus is provided with power via a battery, the control circuitry is configured to control a display of the information processing apparatus to display a second notification.

22. A method performed by an information processing apparatus including a first graphic processor having a first level of graphic performance and a second graphic processor having a second level of graphic performance, which is greater than the first level of graphic performance, the method comprising:
determining, by control circuitry of the information processing apparatus, whether the information processing apparatus is capable of outputting data with the first level of graphic performance or the second level of graphic performance;
selecting, by the control circuitry of the information processing apparatus, one of the first graphic processor or the second graphic processor based on the determining;
determining whether an application executed by the information processing apparatus is affected by the selection of the first graphic processor or the second graphic processor, and
displaying a first notification that indicates the executed application is affected by the selection when the executed application is determined to be affected by the selection.

23. A non-transitory computer readable medium including computer program instructions, which when executed by an information processing apparatus including a first graphic processor having a first level of graphic performance and a second graphic processor having a second level of graphic performance, which is greater than the first level of graphic performance, cause the information processing apparatus to perform a method comprising:
- determining whether the information processing apparatus is capable of outputting data with the first level of graphic performance or the second level of graphic performance;
- selecting one of the first graphic processor or the second graphic processor based on the determining;
- determining whether an application executed by the information processing apparatus is affected by the selection of the first graphic processor or the second graphic processor, and
- displaying a first notification that indicates the executed application is affected by the selection when the executed application is determined to be affected by the selection.

* * * * *